United States Patent
Mroueh et al.

(10) Patent No.: US 12,254,390 B2
(45) Date of Patent: Mar. 18, 2025

(54) WASSERSTEIN BARYCENTER MODEL ENSEMBLING

(71) Applicant: International Business Machines Corporation, Armonk, NY (US)

(72) Inventors: Youssef Mroueh, Yorktown Heights, NY (US); Pierre L. Dognin, Yorktown Heights, NY (US); Igor Melnyk, Yorktown Heights, NY (US); Jarret Ross, Yorktown Heights, NY (US); Tom Sercu, Yorktown Heights, NY (US); Cicero Nogueira Dos Santos, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 16/397,008

(22) Filed: Apr. 29, 2019

(65) Prior Publication Data
US 2020/0342361 A1    Oct. 29, 2020

(51) Int. Cl.
*G06N 20/20* (2019.01)
*G06F 16/25* (2019.01)
*G06F 18/22* (2023.01)
*G06F 18/24* (2023.01)
*G06V 10/764* (2022.01)
*G06V 10/80* (2022.01)

(52) U.S. Cl.
CPC ............ *G06N 20/20* (2019.01); *G06F 16/25* (2019.01); *G06F 18/22* (2023.01); *G06F 18/24* (2023.01); *G06V 10/764* (2022.01); *G06V 10/80* (2022.01)

(58) Field of Classification Search
CPC .............................. G06N 20/20; G06F 16/25
See application file for complete search history.

(56) References Cited

U.S. PATENT DOCUMENTS

| | | | |
|---|---|---|---|
| 8,990,149 B2 | 3/2015 | Danciu et al. | |
| 9,069,916 B2 | 6/2015 | Sarma et al. | |
| 10,013,477 B2 | 7/2018 | Ye et al. | |
| 10,984,054 B2 * | 4/2021 | Alsallakh | G06F 16/583 |
| 2017/0083608 A1 * | 3/2017 | Ye | G06N 20/10 |
| 2018/0089582 A1 | 3/2018 | Bouillet et al. | |
| 2019/0057408 A1 | 2/2019 | Flora et al. | |
| 2019/0304157 A1 * | 10/2019 | Amer | G06V 40/23 |
| 2020/0224172 A1 * | 7/2020 | Schiebinger | C12N 15/86 |
| 2020/0334326 A1 * | 10/2020 | Zhang | G06F 40/197 |

OTHER PUBLICATIONS

Mel, et al. "The NIST Definition of Cloud Computing". Recommendations of the National Institute of Standards and Technology. Nov. 16, 2015.
Dognin et al. "Wasserstein Barycenter Model Ensembling", Conference Paper; IBM Research &MIT-IBM Watson AI Lab, 2019.
(Continued)

*Primary Examiner* — Courtney Harmon
(74) *Attorney, Agent, or Firm* — Stosch Sabo

(57) ABSTRACT

A method, system and apparatus of ensembling, including inputting a set of models that predict different sets of attributes, determining a source set of attributes and a target set of attributes using a barycenter with an optimal transport metric, and determining a consensus among the set of models whose predictions are defined on the source set of attributes.

20 Claims, 16 Drawing Sheets

(56) References Cited

OTHER PUBLICATIONS

Papayiannis et al. "Model Aggregation Using Optimal Transport and Applications in Wind Speed Forecasting", Journal Article; Computer Science and Artificial Intelligence Laboratory, Massachusetts Institute of Technology, Jun. 7, 2018.
Claici et al., "Stochastic Wasserstein Barycenters", Journal Paper, Environ metrics 29.8 WILEY, Dec. 2018.
Agueh et al. "Barycenters in the Wasserstein Space", SIAM Journal on Mathematical Analysis, Jan. 2011, pp. 904-924, vol. 43, Issue No. 2, 10.1137/100805741.
Benamou et al. "An Augmented Lagrangian Approach to Wasserstein Gradient Flows And Applications", ESAIM Proceedings and Surveys, Jun. 2016, pp. 1-17, vol. 54, DOI: 10.1051/proc/201654001.
Breiman et al. "Bagging Predictors", Machine Learning, Aug. 1996, pp. 123-140, vol. 24.
Chizat et al. "Scaling Algorithms for Unbalanced Transport Problems", Mathematics of Computation, 2018, vol. 87, pp. 2563-2609.
Cuturi et al. "Fast Computation of Wasserstein Barycenters", arXiv, Jun. 17, 2014, 9 pages.
Freund et al. "A Short Introduction to Boosting", Journal of Japanese Society for Artificial Intelligence, Sep. 1999, pp. 771-780, vol. 14, Issue No. 5.
Pennington et al. Glove: Global Vectors for Word Representation, Conference: Proceedings of the 2014 Conference on Empirical Methods in Natural Language Processing (EMNLP), Jan. 2014, pp. 1532-1543, vol. 14, DOI: 10.3115/v1/D14-1162.
Wolpert et al. "Stacked Generalization", Neural Networks, Dec. 1992, pp. 241-259, vol. 5, Issue No. 2, https://doi.org/10.1016/S0893-6080(05)80023-1.
Xian et al. "Zero-Shot Learning—The Good, the Bad and the Ugly", arXiv: 1703.04394, Mar. 2017, 10 pages, https://doi.org/10.48550/arXiv.1703.04394.

\* cited by examiner

BA: a television is placed on the curb of the road
AM: a TV sits on the side of a street
GM: a television sitting on the side of a street
GT: an empty sidewalk with an abandoned television sitting alone BA: a person is sitting on the sidewalk with a tent
AM: a couple of people sitting on benches next to a building
GM: a couple of people sitting on the side of a street
GT: a woman is sitting with a guitar near a man that is sitting on the ground in front of a tent BA: a car that is parked at the station
AM: a car that has been shown in a subway
GM: a car that is sitting on the side of a road
GT: a car at the bottom of the stair well BA: a sheep sitting in a car looking out the window
AM: a white sheep is sitting in a vehicle
GM: a close up of a sheep in a car
GT: a sheep sitting at the steering wheel of a car with its hooves on the wheels

WASSERSTEIN BARYCENTER MODEL ENSEMBLING

BACKGROUND OF THE INVENTION

Field of the Invention

The disclosed invention relates generally to an embodiment of a method and system for model ensembling, and more particularly, but not by way of limitation, relating to a method, apparatus, and system for Wasserstein barycenter model ensembling.

Description of the Background Art

In the recent advancement of information technology and computing systems, there has been a need to use automation to process the vast amount information and all the information derived from the rapidly changing physical world. In the automation, there has been advancement in machine learning and artificial intelligence that is used to allow computing devices to automatically learn and process the information.

Modeling has been used to help with prediction and learning in artificial intelligence. In artificial intelligence, model-based reasoning can refer to inference used in expert systems based on a model of the physical world to provide conclusions such as a diagnosis or a prediction.

Model ensembling consists in combining many models into a stronger, robust and more accurate model. Ensembling is ubiquitous in machine learning and yields to improved accuracies across multiple prediction tasks such as multi-class or multi-label classification.

However, there is a need for more efficient and rapid decisions, while increasing accuracy.

SUMMARY OF INVENTION

In view of the foregoing and other problems, disadvantages, and drawbacks of the aforementioned background art, an exemplary aspect of the disclosed invention provides a method, apparatus, and system for Wasserstein barycenter model ensembling.

One aspect of the present invention is to provide ensembling, including inputting a set of models that predict different sets of attributes, determining a source set of attributes and a target set of attributes using a barycenter with an optimal transport metric, and determining a consensus among the set of models whose predictions are defined on the source set of attributes.

Another aspect of the present invention provides a system for ensembling, including a memory storing computer instructions; and a processor configured to execute the computer instructions to: input a set of models that predict different sets of attributes, determine a source set of attributes and a target set of attributes using a barycenter with an optimal transport metric, and determine a consensus among the set of models whose predictions are defined on the source set of attributes.

Another example aspect of the disclosed invention is to provide computer program product comprising a computer readable storage medium having program instructions embodied therewith, the program instructions readable and executable by a computer to cause the computer to perform a method, including inputting a set of models that predict different sets of attributes, determining a source set of attributes and a target set of attributes using a barycenter with an optimal transport metric, and determining a consensus among the set of models whose predictions are defined on the source set of attributes.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF PREFERRED EMBODIMENTS

Figure 1:
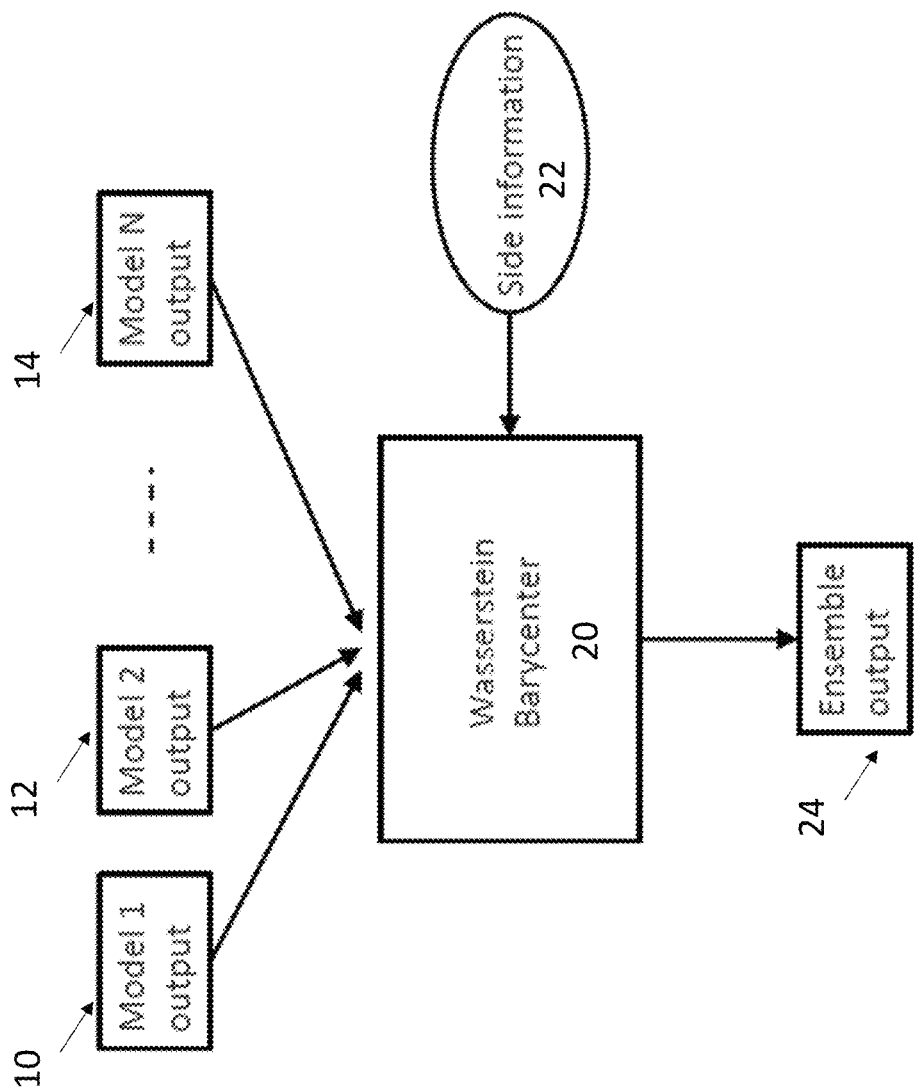
FIG. 1 illustrates a system of an example embodiment.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Model ensembling consists in combining many models into a stronger, robust and more accurate model. Ensembling is ubiquitous in machine learning and yields to improved accuracies across multiple prediction tasks such as multi-class or multi-label classification. For instance in deep learning, output layers of DNNs (Deep Neural Networks) such as softmaxes or sigmoids are usually combined using a simple arithmetic or geometric mean. The arithmetic mean rewards confidence of the models and the geometric means seeks the consensus across models.

What is missing in the current approaches to models ensembling, is the ability to incorporate side information such as class relationships represented by a graph or via an embedding space. Note that each semantic class can be represented with a finite dimensional vector in a pretrained word embedding space. The models predictions can be seen as a distribution in this label space defined by word embeddings: if we note $p_i$ the confidence of a model on a bin, corresponding to a word having a word embedding $x_i$, the distribution on the label space is therefore $p=\sum_i p_i \delta_{x_i}$. In order to find the consensus between many models predictions, instead of staying limited by the bins confidence as in arithmetic and geometric averaging we propose to achieve this consensus within this representation in the label space. This has the advantage of carrying the semantics to model averaging via the words embeddings.

The goal of model ensembling is to achieve improved results by combining decisions from several models decisions. If the ensembled models are different in the errors they make, a properly constructed ensemble usually has a better performance and is more stable than any single model. The classical approaches for ensembling are bagging, boosting and stacking. In bagging, multiple independent models are trained on random subset of the data, and then the final result is obtained by combining the votes using arithmetic or geometric mean (in a simple or weighted forms) from each model. Note that the use of arithmetic mean rewards confidence of the models while the use of geometric mean seeks the consensus across models. In boosting the same training data is used by all the models but each subsequent learned model uses data weighted by the performance of the previously learned model. In this case, each subsequent model is forced to pay more attention to incorrectly classified data samples and ignore others. The final result, similarly as before, is obtained by combining the votes from each model. Finally, in stacking the output of multiple base models are combined via another learning algorithm (for example, neural network) which then produces the final result.

In recent deep learning approaches, ensembling is simply achieved by combining several deep neural networks (DNNs) with an arithmetic or geometric mean. Here, the output layer of each DNN, such as softmax or sigmoid, is combined to get a joint output of the ensemble.

As mentioned, one of the features missing in the currently employed approaches is the ability to incorporate side information to create even stronger and tunable ensembles.

For example, in the classification problem, the present system can combine the models not only based on their class label confidence but also utilize the relationship between the labels. For instance, suppose that several models are confident about different but semantically related labels. A simple averaging cannot take advantage of this scenario, producing confusing results, degrading the performance of the ensemble. On the other, using the side information, we can get a boost from intelligently combining those predictions (using their semantic relations), improving the ensemble accuracy.

The side information can come from many sources. For example, for a classification task this information can come from label relationships represented by a graph or via an embedding space. Often each semantic class can be represented with a finite dimensional vector in a pretrained word embedding space such as GloVe. The models' predictions can be seen as defining a distribution in this label space defined by word embeddings. In order to find the consensus between many models predictions, we propose to achieve this consensus within this representation in the label space. In contrast to arithmetic and geometric averaging, which are limited to the independent bins' confidence, this has the advantage of carrying the semantics to model averaging via the word embeddings.

To incorporate the side information in the model ensembling, the inventors propose to use Wasserstein barycenter, which enables the balance of the model confidence and semantic side information to find a consensus between the models. Wasserstein distances are a naturally good fit for such a task, since they are defined with respect to a ground metric in the label space of the models, which carry the semantic information. Moreover, they enable the possibilty of ensembling predictions defined on different labels, since the Wasserstein distance allows to align and compare predictions of different sets. Since their introduction, Wasserstein barycenter computations were facilitated by entropic regularization and iterative algorithms that rely on iterative Bregman projections. Wasserstein barycenters are effective in model ensembling and in finding a semantic consensus, and can be applied to a wide range of problems in the machine learning pipeline.

FIG. 1 illustrates a system of an example embodiment. Therefore, to achieve this goal, the system 100 combines model predictions via Wasserstein barycenters 20, which enables the system to balance the confidence of the models 10, 12, 14 (e.g., models 1 to model N) and the semantic side information 22 in finding a consensus between the models to provide an ensemble output 24.

As mentioned, Wasserstein distances are a good fit for such a task, since they are defined with respect to a ground metric in the label space of the models, which will carry the semantic information. Moreover they enable the possibilty of ensembling predictions defined on different label sets, since the Wasserstein distance allows to align and compare those different predictions. The Wasserstein barycenter 20 computations were facilitated by entropic regularization and iterative algorithms that rely on iterative Bregman projections The Wasserstein Barycenters 20 are effective in model ensembling and in finding a semantic consensus and can be applied to a wide range of problems in the machine learning pipeline. Additional barycenters 20 can be used in the system 100.

Concerning normalized and unnormalized predictions ensembling, the following is discussed. In deep learning, predictions on a label space of fixed size M are usually in one of two forms: a) normalized probabilities: in a multiclass setting, the neural network outputs a probability vector (normalized through softmax). Each bin corresponds to a semantic class. b) Unnormalized Positive scores: in a multi-label setting, the outputs of M independent logistics are unnormalized positive scores, where each unit corresponds to the presence or the absence of a semantic class.

Model ensembling in those two scenarios has long history in deep learning and more generally in machine learning as they lead to more robust and accurate models. As discussed, two methods have been prominent in model ensembling due to their simplicity: majority vote using the arithmetic mean of predictions or consensus based using the geometric mean.

Note that in both cases (multi-class or multi-label), each semantic class can be represented with a finite dimensional vector in a pretrained word embedding space such as Glove or word2vec. Arithmetic and geometric mean don't use this semantic information in finding the consensus, and rely only on the confidence of the models.

Revisiting Arithmetic and Geometric Means from a geometric viewpoint. Let us first define: given m predictions $\mu_l$, and weights $\lambda_l \geq 0$ such that $\Sigma_{l=1}^{m} \lambda_l = 1$, the weighted arithmetic mean is given by $\bar{\mu}_a = \Sigma_{l=1}^{m} \lambda_l \mu_l$, and the weighted geometric mean is given by $\mu_g = \Pi_{l=1}^{m} (\mu_l^{\lambda_l})$.

It is instructive to reinterpret the arithmetic and geometric mean as weighted Frechet means (Definition 1).

Definition 1. [Weighted Frechet Mean] Given a distance d and $\{(\lambda_l, \mu_l), \lambda_l > 0, \mu_l \in \mathbb{R}_+^M\}_{l=1 \ldots m}$, the Frechet mean is defined as follows: $\bar{\mu} = \arg\min_p \Sigma_{l=1}^{m} \lambda_l d(p, \mu_l)$.

It is easy to prove that the arithmetic mean corresponds to a Frechet mean for $d=\|\cdot\|_2^2$ (the $l_2$ euclidian distance), and the geometric mean to a Frechet Mean for $d=\widetilde{KL}$, where $\widetilde{KL}$ is the extended KL divergence to non-normalized measures:

$$\widetilde{KL}(p, q) = \sum_i p_i \log\left(\frac{p_i}{q_i}\right) - p_i + q_i.$$

Following this geometric viewpoint, in order to incorporate the semantics of the target space in model ensembling, we need to use a distance d that takes advantage of the underlying geometry of the word embedding label space when comparing positive measures. Optimal transport (OT) metrics such as Wasserstein-2 have this property since they are built on an explicit cost matrix defining pairwise distance between the semantic classes.

In the present invention, the system 100 uses the Frechet means with Wasserstein distance ( ) (d=$W_2^2$) for model ensembling, i.e. use Wasserstein Barycenters 20 for model ensembling:

$$\bar{\mu}_w = \operatorname*{argmin}_{\rho} \sum_{l=1}^{m} \lambda_l W_2^2(\rho, \mu_l)$$

Intuitively the Wasserstein barycenter 20 looks for a distribution p that is close to all base distributions $\mu_l$ in the Wasserstein sense. In our context transporting ρ to each individual model $\mu_l$ should have minimum cost, where the cost is defined by the distance in the word embedding space.

The Wasserstein barycenters 20 are further detailed as follows. Wasserstein distances were originally defined between normalized probability vectors (Balanced OT), but they have been extended to deal with unnormalized measures and this problem is referred to as unbalanced OT. Motivated by the multi-class and the multi-label ensembling applications we present in the following a brief overview Wasserstein barycenters 20 in the balanced and unbalanced cases.

The optimal transport metrics are detailed as follows. Balanced OT (optimal transport): Given p∈$\Delta_N$, where $\Delta_N = \{p \in \mathbb{R}^N, p_k \geq 0, \Sigma_{k=1}^{N} p_k = 1\}$ p represents histograms on source label space $\Omega^S = \{x_i \in \mathbb{R}^d, i=1 \ldots N\}$, in our case this corresponds to words embeddings. Consider similarly q∈$\Delta_M$ representing histograms whose bins are defined on a target label space $\Omega^T = \{y_j \in \mathbb{R}^d, j=1 \ldots M\}$. Consider a cost function c(x,y), (for example c(x,y)=kx−yk$^2$). Let C be the matrix in $\in \mathbb{R}^{N \times M}$ such that $C_{ij}=c(x_i, y_j)$. $1_N$ denotes a vector with all ones. Let $\gamma \in \mathbb{R}^{N \times M}$ be a coupling matrix whose marginals are p and q i.e. such that: $\gamma \in \Pi(p,q) = \{\gamma \in \mathbb{R}^{N \times M}, \gamma 1_M = p, \gamma^T 1_N = q\}$. The optimal transport metric is defined as follows:

$$W(p, q) = \min_{\gamma \in \Pi(p,q)} \{\langle C, \gamma \rangle = \sum_{ij} C_{ij} \gamma_{ij}\} \quad (1)$$

When $c(x,y)=\|x-y\|_2^2$, this distance corresponds to the so called Wasserstein-2 distance $W_2^2$.

Unbalanced OT is detailed as follows. When p and q are unnormalized and have different total masses, optimal transport metrics have been extended to deal with this unbalanced case. The main idea is in relaxing the set Π(p,q) using a divergence such as the extended KL divergence.$_f$ define for λ>0 the following generalized Wasserstein distance between unnormalized measures:

$$W_{unb}(p, q) = \min_{\gamma} \langle C, \gamma \rangle + \lambda \widetilde{KL}(\gamma 1_M, p) + \lambda \widetilde{KL}(\gamma^T 1_N, q). \quad (2)$$

Balanced and unbalanced Wasserstein in models ensembling if further detailed as follows. Throughout, the system 100 considers m discrete prediction vectors $\mu_l \in \mathbb{R}_+^{N_l}$, l=1 . . . m defined on a discrete space (word embeddings) $\Omega_l^S = \{x_i^l \in \mathbb{R}^d, i=1 \ldots N\}$. The system 100 refers to $\Omega_l^S$ as source spaces. The goal of the system 100 is to find a consensus prediction $\bar{\mu}_w \in \mathbb{R}_+^M$ defined on a target discrete space $\Omega^T = \{y_j \in \mathbb{R} d, j=1 \ldots M\}$. Let $C_l \in \mathbb{R}^{N+M}$ be the cost matrices, $C_{l,i,j} = c(x_i^l, y_j)$.

Balanced W. Barycenters: Normalized predictions. The Wasserstein barycenter 100 of normalized predictions is defined as follows:

$$\bar{\mu}_w = \operatorname*{argmin}_{\rho} \sum_{l=1}^{m} \lambda_l W(\rho, \mu_l)$$

for the Wasserstein distance W defined in equation (1). Hence one needs to solve the following problem, for m coupling matrices $\gamma_l$, l=1 . . . m:

$$\min_{\rho} \min_{\gamma_l \in \Pi(\mu_l, \rho), l=1 \ldots m} \sum_{l=1}^{m} \lambda_l \langle C_l, \gamma_l \rangle. \quad (3)$$

Unbalanced W. Barycenters: Unnormalized predictions. Similarly the Wasserstein barycenter 20 of unnormalized predictions is defined as follows:

$$\bar{\mu}_w = \operatorname*{argmin}_{\rho} \sum_{l=1}^{m} \lambda_l GW(\rho, \mu_l),$$

for the generalized Wasserstein distance $W_{unb}$ defined in equation (2). Hence the unbalanced Wasserstein barycenter 20 problem amounts to solving, for m coupling matrices $\lambda_l'$, l=1 ... m:

$$\min_{p} \min_{\gamma_\ell, \ell=1...m} \sum_{\ell=1}^{m} \lambda_\ell (\langle C_\ell, \gamma_\ell \rangle + \lambda \widetilde{KL}(\gamma_\ell 1_M, \mu_\ell) + \lambda \widetilde{KL}(\gamma_\ell^T 1_{N_\ell}, \rho)). \quad (4)$$

Computation via entropic regularization and practical advantages are further detailed as follows including Entropic Regularized Wasserstein Barycenters Algorithms. The computation of the Wasserstein distance grows super-cubicly in the number of points. This issue was alleviates by the introduction of the entropic regularization to the optimization problem making it strongly convex and solved with scaling algorithms such as the so called Sinkhorn algorithm. For any positive matrix $\gamma$, the entropy is defined as follows: $H(\gamma) = -\sum_{ij}^{P} \gamma_{ij}(\log(\gamma_{ij})-1)$. The entropic regularized OT distances in the balanced and unbalanced case become, for a hyper-parameter $\varepsilon > 0$:

$$W_\varepsilon(p, q) = \min_{\gamma \in \Pi(p,q)} \langle C, \gamma \rangle - \varepsilon H(\gamma),$$

$$W_{unb,\varepsilon}(p, q) = \min \langle C, \gamma \rangle + \lambda \widetilde{KL}(\gamma 1_M, p) + \lambda \widetilde{KL}(\gamma^T 1_N, q) - \varepsilon H(\gamma) \gamma$$

for $\varepsilon \to 0$, $W_\varepsilon$ and $W_{unb,\varepsilon}$ converge to the original OT distance, and for higher value of $\varepsilon$ we obtain the so called Sinkhorn divergence that allows for more diffuse transport between p and q. Balanced and unbalanced Wasserstein barycenters can be naturally defined with the entropic regularized OT distance as follows:

$$\min_{\rho} \sum_{l=1}^{m} \lambda_l W_\varepsilon(\rho, \mu_l)$$

and $$\min_{\rho} \sum_{l=1}^{m} \lambda_l GW_\varepsilon(\rho, \mu_l)$$

respectively. This regularization lead to simple iterative algorithms for computing Wasserstein barycenters that are given in Algorithms 1 and 2.

---

Algorithm 1: Balanced Barycenter for Multi-class Ensembling

Inputs: $\varepsilon, C_\ell$, (|source| × |target|), $\lambda_\ell, \mu_\ell$
Initialize
$K_\ell = \exp(-C_\ell/\varepsilon), v_\ell \leftarrow 1_M, \forall \ell = 1 ... m$
for i = 1 ... Maxiter do $$u_\ell \leftarrow \frac{\ell}{K u_\ell}, = 1 ... m$$

$$p \leftarrow \exp\left(\sum_{\ell=1}^{m} \lambda_\ell \log(K_\ell^T u_\ell)\right) = \prod_{\ell=1}^{m} (K_\ell^T u_\ell)^{\lambda_\ell}$$

---

Algorithm 1: Balanced Barycenter for Multi-class Ensembling $$v_\ell \leftarrow \frac{p}{K_\ell^T u_\ell} \ell = 1 ... m$$

end for
Output: p

---

Algorithm 2: Unbalanced Barycenter for Multi-label Ensembling

Inputs: $\varepsilon, K_\ell$, (C · |source| × |target|)
Initialize
$K_\ell = \exp(-C_\ell/\varepsilon), v_\ell \leftarrow 1, \forall \ell$
1 ... m for i = 1 ... Maxiter do $$u_\ell \leftarrow \left(\frac{\mu_\ell}{K v_\ell}\right)^{\frac{\lambda}{\lambda+\varepsilon}}, \forall \ell = 1 ... m$$

$$p \leftarrow \left(\sum_{\ell=1}^{m} \lambda_\ell (K_\ell^T u_\ell)^{\frac{\varepsilon}{\lambda+\varepsilon}}\right)^{\frac{\lambda+\varepsilon}{\varepsilon}}$$

$$v_\ell \leftarrow \left(\frac{p}{K_\ell^T u_\ell}\right)^{\frac{\lambda}{\lambda+\varepsilon}} \ell = 1 ... m,$$

end for
Output: p

---

We see that the output of Algorithm 1 is the geometric mean of $K_l^T \mu_l$, l=1 ... m, where $K_l$ is a gaussian kernel with bandwidth $\varepsilon$ the entropic regularization parameter. Note $v_l^*$, l=1 ... m the values of $v_l$ at convergence of Algorithm 1. The entropic regularized Wasserstein barycenter can be written as follows:

$$\exp\left(\sum_{\ell=1}^{M} \lambda_\ell \left(\log(K_\ell \mu_\ell) - \log(K_\ell v_\ell^*)\right)\right).$$

We see from this that $K_l$ appears as matrix product multiplying individual models probability $\mu_l$ and the quantities $v_l^*$ related to Lagrange multipliers. This matrix vector product with $K_l$ ensures probability mass transfer between semantically related classes i.e between items that has entries $K_{l,i,j}$ with high values.

(The case $K_l = K = I$). As the kernel K in Algorithm 1 approaches I (identity) (this happens when $\varepsilon \to 0$), the alternating Bregman projection for balanced Wasserstein barycenter 20 converges to the geometric mean $\mu_g = \Pi_{l=1}^{m}(\mu_l)^{\lambda_l}$. This is easy to see, when K=I, for all iterations we have $v_l = 1_M$, and $u_l = \mu_l$. When K=I the fixed point of Algorithm 1 reduces to geometric mean. Note that K approaches identity as $\varepsilon \to 0$, and in this case we don't exploit any semantics.

Practical Advantages of Wasserstein Barycenters in Models Ensembling is detailed as follows. In the simplest case $\Omega_l^S = \Omega^T$ and $N_l = M$ for all l, this corresponds to the case we discussed in multi-class and multilabels ensemble learning. Wasserstein barycenters 20 allows to balance semantics and confidence in finding the consensus. The case where source and target spaces are different is also of interest, we give here few applications examples:

a) $\mu_l$ correspond to predictions on a small vocabulary and we wish to expand through the Wasserstein barycenter $\mu_w$ to prediction on a larger size vocabulary.

b) $\mu_l$ correspond to prediction on a set of attributes and we wish to make predictions through the Wasserstein barycenter 20 on a set of labels defined with those attributes. This is of particular interest in zero shot or few shot learning. The flexibility of the Wasserstein barycenter 20 in ensembling predictions defined on different spaces $\Omega^S$, and targeting a different space $\Omega^T$ gives it a big practical advantage with respect to other ensembling methods such as arithmetic or geometric mean that can not handle this case.

The theoretical advantages of Wasserstein barycenters 20 in models ensembling is further detailed as follows including Smoothness of the Wasserstein Barycenter 20 within Semantically Coherent Clusters. The system 100 considers $\Omega_l^S = \Omega^T = \Omega$, i.e the Wasserstein barycenters and all individual models are defined on the same label space. When we are ensembling models, one *desiderata* is to have an accurate aggregate model. Smoothness and Diversity of the predictions of the ensemble is another *desiderata* as we often want to supply many diverse hypotheses. In the context of sequence generation in language modeling such as image captioning, machine translation or dialog, this is very important as we use beam search on the predictions, diversity and smoothness of the predictions become key to the creativity and the composition of the sequence generator in order to go beyond "baby talk" and vanilla language based on high count words in the training set. Hence the system 100 needs to increase the entropy of the prediction by finding a semantic consensus whose predictions are diverse and smooth on semantically coherent concepts without compromising accuracy.

We will show in the following proposition that the Wasserstein barycenter 20 allows such aggregation:

Proposition 1 (Properties of Wasserstein Barycenters). Let v be the target distribution (an oracle) defined on a discrete space $\Omega = \{x_1, \ldots x_K, x_j \in \mathbb{R}_d\}$ (word embedding space) and $\mu_l, l = 1 \ldots m$ be m estimates of v. Assume $W_2^2(\mu_l, v) \leq \varepsilon_l$. The Wasserstein barycenter $\overline{\mu_w}$ of $\{\mu_l\}$ satisfies the following:

Semantic Accuracy (Distance to an oracle). We have: $W_2^2(\overline{\mu_w}, v) \leq 4\Sigma_{l=1}^m \lambda_l W_2^2(\mu_l, v)$. Assume that $W_2^2(\mu_l, v) \leq \varepsilon_l$, then we have: $W_2^2(\overline{\mu_w}, v) \leq 4\Sigma_{l=1}^m \lambda_l \varepsilon_l$.

Diversity. The diversity of the Wasserstein barycenter 20 depends on the diversity of the models with respect to the Wasserstein distance (pairwise Wasserstein distance between models): $W_2^2(\overline{\mu_w}, \mu_k) \leq \Sigma_{l \neq k}^m \lambda_l W_2^2(\mu_l, \mu_k), \forall k = 1, \ldots m$ Concerning smoothness in the embedding space, from defining the smoothness energy, the Wasserstein barycenter can be seen as smoother in the embedding space than the individual models.

We see from Proposition 1 that the Wasserstein barycenter 20 preserves accuracy, but has a higher entropy than the individual models. This entropy increase is due to an improved smoothness on the embedding space: words that have similar semantics will have similar probability mass assigned in the barycenter. The diversity of the barycenter depends on the Wasserstein pairwise distance between the models: the Wasserstein barycenter output will be less diverse if the models have similar semantics as measured by the Wasserstein distance. The proof of proposition 1 relies on the notion of convexity along generalized geodesics of the Wasserstein 2 distance.

In order to illustrate the diversity and smoothness of the Wasserstein barycenter 20 we give here some examples of the Wasserstein barycenter 20 on a vocabulary size of 10000 words, where the cost matrix is constructed from word synonyms ratings that we defined using a thesaurus or using Glove word embedding. We compute the Wasserstein barycenter 20 (using Algorithm 1) between 4 Softmax outputs of 4 image captioners trained using different random seeds and objective functions.

Therefore, the system 100 uses Wasserstein Barycenters 20 to combine the decision of multiple models given a side information. Models decisions are often expressed as output distributions. For instance, discriminative models are trained to provide posterior distributions p(c|x) over N-dimensional vector c given an input x. The side information is represented as a cost matrix of size N×N, where C(i,j) is the cost of transporting probability mass from bin i (corresponding to class i) to bin j (corresponding to class j). Under this cost matrix, the Wasserstein Barycenter 20 defines a scheme of transporting probability masses which enables combining multiple inputs to generate an output distribution, utilizing the relevant side information. The system 100 is novel in the use of Wasserstein Barycenters 20 for ensembling models 10, 12, 14 while leveraging side information 22.

As mentioned, commonly used ensembling methods are arithmetic averaging (leveraging confidence) and geometric averaging (promoting consensus). However, they lack the ability to modify the ensembled decision given available external knowledge of the task at hand, i.e., they are zero-knowledge ensembling methods. The system 100 is different from these approaches as it allows for a formal integration of outside knowledge and modification of the ensembled decision at test time accordingly. In the case of a classification task, the models output p(c|x), the posterior of class c given observed input x. If we know that certain class c_j is completely unlikely, a very high transportation cost can be allocated to this class, i.e., C(i,j) is high for all i=1 . . . N, so that the resulting barycenter will have no mass allocated to class c_j. As another example, if class j is frequently confused with class i (i.e., the correct class is j, while the model predicts i), we can assign C(i,j) a low or zero cost, so that the Wasserstein Barycenter 20 can do error correction during ensembling. This allows for modifying the output decision at ensembling time as we can suppress or augment the transport of mass to some classes based on the available side information. This is a unique feature of our proposed method that requires no other processing or training steps (like in boosting or stacking) and encompasses side-information unlike bagging techniques.

For discriminative models 10, 12, 14, a model estimates a vector of posterior probabilities p(c|x) where x is the input sample and c is a vector of all N classes c_i, for i=1 . . . N. Here, p(c|x) is a valid probability distribution, i.e., sum_i p(c_i|x)=1. Let C be a cost matrix where C(i,j) in R^{N×N} (set of real numbers) is the cost of transporting probability mass from class c_i to c_j. The Wasserstein Barycenter 20 takes a set of posterior vectors p_k(c|x), for k=1 . . . K from each of K models, matrix C and estimates a posterior vector p_WB(c|x), which is the output of the Wasserstein Barycenter ensembling.

If we extend from classification to multi-label prediction, the output of each model is q(c_i|x), where sum_i q(c_i|x) is not equal to 1 anymore, i.e., it is an unnormalized distribution over the N labels c_i. In this case, we can use the unbalanced Wasserstein Barycenter 20, defined for unnormalized input distributions. Similarly as before, the algorithm takes into account the side information in the form of a transportation cost C, the outputs of each model q_k (c_i|x), k=1 . . . K and computes a Wasserstein barycenter—the ensemble output.

Wasserstein Barycenters are not limited to ensembling distributions within the same domain, they can be used to ensemble input distributions defined in $R^N$ into output distribution defined in $R^M$. For instance, given model output p(c_i|x), where c_i represents N classes, Wasserstein Barycenter 20 can use a transportation cost matrix C of size N×M to compute the ensemble output p_WB(m_i|x), which is a distribution over m_i classes for a total of M classes. This cross domain functionality is especially useful in the problems of zero-shot learning.

Figure 2:
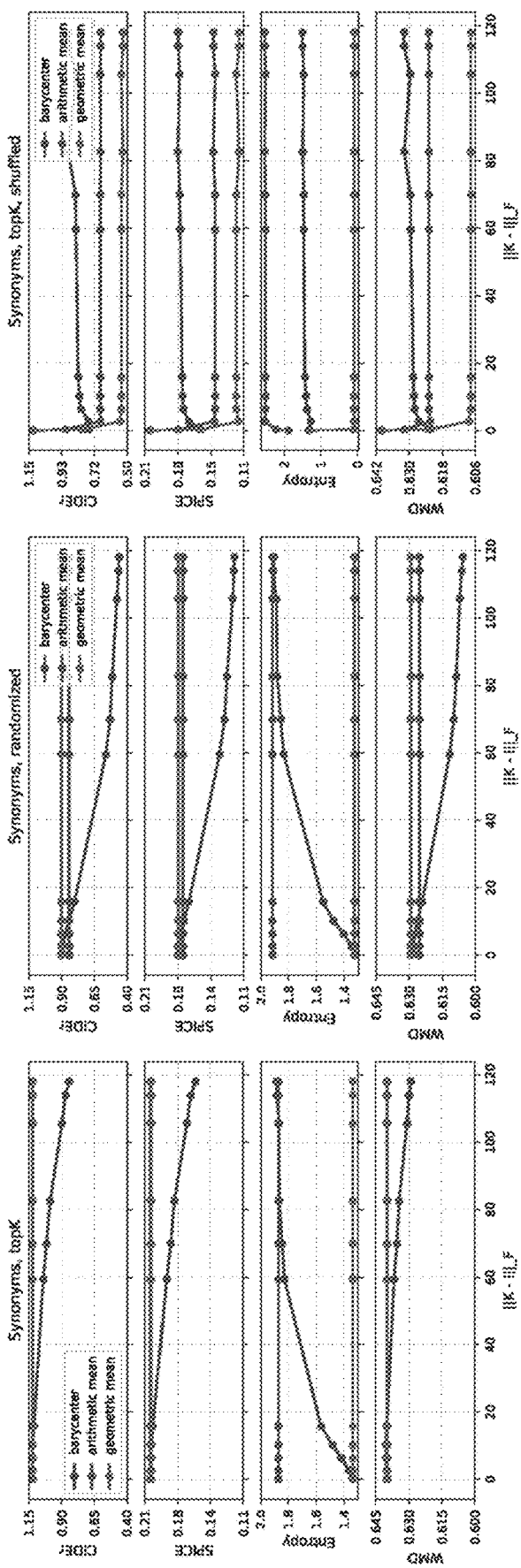
FIG. 2 illustrates the Wasserstein barycenter as well as the arithmetic and geometric mean results.

FIG. 2 illustrates the Wasserstein barycenter 20 as well as the arithmetic and geometric mean. Based on the graphs, the following observations are noted. The Wasserstein barycenter 20 has higher entropy and is smooth along semantics (synonyms or semantics in the Glove space) and hence more diverse than individual models.

Table 1 shown below, shows the (top 20 words) of barycenter 20, arithmetic and geometric means, we see indeed that the W. Barycenter outputs cluster according to semantics. In order to map back words $x_j$ that have high probability in the Wasserstein barycenter 20 to an individual model ', we can use the couplings γ' as follows: $\gamma_{ij}'$ is the coupling between word j in the barycenter and word i in model '.

Examples are given in Table 3 shown below.

Controllable Entropy via Regularization is discussed as follows. The following Lemma relates the entropy of the Wasserstein barycenter 20 to the entropy of the couplings γ': Lemma 1 (Entropic Regularized W. Barycenters: Controllable entropy via ε). Assume that μ', are such that μ',i>0, for '=1 ... m, i=1 ... M, we have: $\Sigma_{l=1}^{m}\lambda_l(H(\gamma_l)-\|\gamma_l\|_1) \leq H(\overline{\mu_w}) + \Sigma_{l=1}^{m}\lambda_l H(\mu_l)$ As the entropic regularization parameter e increases the distance of the kernel K to identity increases and the entropy of $\gamma_l$, $H(\gamma_l)$ increases as well. Assuming we have fixed individual models $\mu_l$, '=1 ... m and that the total mass kγ·k₁ is kept constant as we increase ε, we see from 1 that the lower bound of the entropy of the Wasserstein barycenter increases with ε. Hence the entropy of entropic regularized Wasserstein Barycenter is controllable via the entropic regularization parameter ε. This is illustrated in Tables 2 and 4, we see that the entropy of the (entropic regularized) Wasserstein barycenter 20 increases as the distance of the kernel K to identity increases (as ε increases) and the output of the W. barycenter remains smooth within semantically coherent clusters.

TABLE 1

Sample output (top 20 words) of barycenter, arithmetic and geometric means for the input from four models. Each column shows a word and its corresponding probability over the vocabulary. (probability given in percentage)

| Rank | W. Barycenter | | Arithmetic | | Geometric | | Model 1 | | Model 2 | | Model 3 | | Model 4 | |
|---|---|---|---|---|---|---|---|---|---|---|---|---|---|---|
| 0 | car | 03.73 | car | 45.11 | car | 41.94 | car | 61.37 | car | 62.25 | car | 33.25 | car | 46.88 |
| 1 | van | 03.50 | fashion | 04.37 | truck | 02.23 | cars | 02.79 | cars | 03.16 | fashion | 18.15 | truck | 07.74 |
| 2 | truck | 03.49 | truck | 02.92 | black | 01.67 | parking | 02.62 | white | 02.22 | black | 03.08 | bus | 04.78 |
| 3 | vehicle | 03.46 | buildin | 02.10 | train | 01.51 | vehicle | 01.93 | black | 01.95 | truck | 02.29 | vehicle | 03.46 |
| 4 | wagon | 03.32 | bus | 02.00 | fashion | 01.49 | model | 01.75 | train | 01.68 | red | 01.88 | red | 02.20 |
| 5 | automob | 03.32 | black | 01.79 | bus | 01.30 | train | 01.26 | passeng | 01.33 | photo | 01.57 | van | 01.93 |
| 6 | coach | 02.99 | train | 01.73 | vehicle | 01.14 | truck | 01.22 | model | 01.24 | parking | 01.52 | fashion | 01.74 |
| 7 | auto | 02.98 | parking | 01.55 | photo | 01.01 | buildin | 01.17 | photo | 01.21 | city | 01.41 | passeng | 01.56 |
| 8 | bus | 02.85 | vehicle | 01.49 | van | 01.01 | black | 01.04 | truck | 01.15 | train | 01.30 | pickup | 01.37 |
| 9 | sedan | 02.71 | cars | 01.41 | red | 01.01 | van | 01.04 | red | 01.15 | buildin | 00.74 | black | 01.29 |
| 10 | cab | 02.70 | photo | 01.29 | parking | 00.94 | fashion | 00.82 | silver | 01.03 | fashion | 00.72 | train | 00.79 |
| 11 | wheels | 02.70 | red | 01.26 | buildin | 00.88 | suv | 00.69 | vehicle | 00.78 | bus | 00.71 | style | 00.68 |
| 12 | buggy | 02.70 | van | 01.18 | cars | 00.81 | automob | 00.67 | van | 00.75 | style | 00.69 | model | 00.59 |
| 13 | motor | 02.39 | white | 01.04 | passeng | 00.71 | parked | 00.57 | buildin | 00.71 | time | 00.67 | fire | 00.57 |
| 14 | jeep | 02.31 | passeng | 00.92 | white | 00.67 | picture | 00.55 | bus | 00.70 | old | 00.58 | white | 00.52 |
| 15 | machine | 02.30 | model | 00.81 | model | 00.60 | bus | 00.48 | yellow | 00.69 | picture | 00.49 | silver | 00.46 |
| 16 | limousi | 02.27 | city | 00.73 | picture | 00.49 | photo | 00.47 | style | 00.67 | traffic | 00.47 | classic | 00.44 |
| 17 | black | 01.67 | silver | 00.55 | silver | 00.47 | suitcas | 00.44 | picture | 00.67 | light | 00.45 | cars | 00.44 |
| 18 | white | 00.85 | picture | 00.54 | style | 00.43 | broken | 00.40 | blue | 00.59 | vehicle | 00.45 | photo | 00.43 |
| 19 | red | 00.54 | style | 00.50 | city | 00.38 | passeng | 00.39 | photogr | 00.44 | photogr | 00.43 | colored | 00.42 |

TABLE 2

Controllable Entropy of regularized Wasserstein Barycenters: Output (top 20 words) of the Wasserstein barycenter (Algorithm 1) for different similarity matrices K based on synonyms (columns titles denote the distance of K from identity $\|K - I\|_F$). Each column shows a word and its corresponding probability over the vocabulary. The distance of the similarity matrix to identity is controllable through the entropic regularization parameter ε. As ε decreases the distance of K to identity increases, and the entropy of the output of Algorithm 1 decreases. Note that the last column coincides with the output from geometric mean (as we approach the identity matrix, Algorithm 1 coincides with geometric mean).

| Rank | 109.7 | | 79.8 | | 59.4 | | 43.3 | | 15.8 | | 0.25 | |
|---|---|---|---|---|---|---|---|---|---|---|---|---|
| 0 | car | 10.51 | car | 12.79 | car | 15.52 | car | 19.22 | car | 33.60 | car | 41.94 |
| 1 | truck | 10.30 | vehicle | 10.24 | vehicle | 10.48 | vehicle | 10.26 | vehicle | 05.64 | truck | 02.23 |
| 2 | vehicle | 09.73 | truck | 09.16 | auto | 08.87 | auto | 08.42 | auto | 03.45 | black | 01.67 |
| 3 | auto | 08.46 | auto | 08.82 | truck | 07.96 | truck | 06.59 | truck | 03.31 | train | 01.51 |
| 4 | machine | 08.17 | machine | 06.17 | machine | 04.33 | machine | 02.55 | black | 01.67 | fashion | 01.49 |
| 5 | black | 01.67 | black | 01.67 | black | 01.67 | black | 01.67 | bus | 01.54 | bus | 01.30 |
| 6 | fashion | 01.49 | fashion | 01.49 | fashion | 01.49 | fashion | 01.49 | fashion | 01.49 | vehicle | 01.14 |

TABLE 2-continued

Controllable Entropy of regularized Wasserstein Barycenters: Output (top 20 words) of the
Wasserstein barycenter (Algorithm 1) for different similarity matrices K based on synonyms (columns
titles denote the distance of K from identity $\|K - I\|_F$). Each column shows a word
and its corresponding probability over the vocabulary. The distance of the similarity matrix
to identity is controllable through the entropic regularization parameter ε. As ε decreases
the distance of K to identity increases, and the entropy of the output of Algorithm 1 decreases.
Note that the last column coincides with the output from geometric mean (as we approach the
identity matrix, Algorithm 1 coincides with geometric mean).

| Rank | 109.7 | | 79.8 | | 59.4 | | 43.3 | | 15.8 | | 0.25 | |
|---|---|---|---|---|---|---|---|---|---|---|---|---|
| 7  | red     | 01.06 | red     | 01.05 | van     | 01.06 | van     | 01.12 | van     | 01.08 | photo   | 01.01 |
| 8  | white   | 00.98 | van     | 00.99 | red     | 01.04 | bus     | 01.11 | red     | 01.01 | van     | 01.01 |
| 9  | parking | 00.94 | parking | 00.94 | parking | 00.94 | red     | 01.03 | photo   | 00.96 | red     | 01.01 |
| 10 | van     | 00.91 | white   | 00.91 | bus     | 00.88 | parking | 00.94 | parking | 00.94 | marking | 00.94 |
| 11 | cars    | 00.81 | cars    | 00.81 | white   | 00.85 | cars    | 00.81 | cars    | 00.81 | buildin | 00.88 |
| 12 | coach   | 00.73 | bus     | 00.69 | cars    | 00.81 | white   | 00.79 | train   | 00.81 | cars    | 00.81 |
| 13 | photogr | 00.64 | coach   | 00.67 | photo   | 00.69 | photo   | 00.77 | buildin | 00.72 | passeng | 00.71 |
| 14 | photo   | 00.57 | photo   | 00.63 | coach   | 00.61 | coach   | 00.55 | white   | 00.68 | white   | 00.67 |
| 15 | bus     | 00.52 | photogr | 00.59 | photogr | 00.55 | photogr | 00.49 | passeng | 00.67 | model   | 00.60 |
| 16 | traffic | 00.46 | traffic | 00.42 | traffic | 00.38 | passeng | 00.45 | silver  | 00.47 | picture | 00.49 |
| 17 | exchang | 00.44 | pickup  | 00.37 | passeng | 00.37 | buildin | 00.41 | pickup  | 00.37 | silver  | 00.47 |
| 18 | pickup  | 00.37 | exchang | 00.34 | pickup  | 00.37 | silver  | 00.40 | photogr | 00.36 | style   | 00.43 |
| 19 | parked  | 00.33 | parked  | 00.33 | silver  | 00.35 | pickup  | 00.37 | old     | 00.33 | city    | 00.38 |

Applications are further detailed here. One can evaluate W. (Wasserstein) barycenter ensembling in the problems of attribute-based classification, multi-label prediction and in natural language generation in image captioning.

As a first simple problem we study object classification based on attribute predictions. We use Animals with Attributes which has 85 attributes and 50 classes. We have in our experiments 2 attributes classifiers to predict the absence/presence of each of the 85 attributes independently, based on (1) resnet18 and (2) resnet34 input features while training only the linear output layer. We split the data randomly in 30322/3500/3500 images for train/validation/test respectively. The system 100 trains the attribute classifiers on the train split.

Based on those two attributes detectors we would like to predict the 50 categories using unbalanced W. barycenters using Algorithm 2. Note that in this case the source domain is the set of the 85 attributes and the target domain is the set of 50 animal categories. For Algorithm 2 we use a column-normalized version of the binary animal/attribute matrix as K matrix (85 50), such that per animal the attribute indicators sum to 1. We selected the hyperparameters ε=0.3 and λ=2 on the validation split and report here the accuracies on the test split.

TABLE 3

Attribute-based classification. The W. barycenter ensembling
achieves better accuracy by exploiting the cross-domain
similarity matrix K, compared to a simple linear-transform
of probability mass from one domain to another as for
the original models or their simple averages.

| Accuracy | resnet18 alone | resnet34 alone | Arithmetic | Geometric | W. Barycenter |
|---|---|---|---|---|---|
| Validation | 0.7771 | 0.8280 | 0.8129 | 0.8123 | 0.8803 |
| Test | 0.7714 | 0.8171 | 0.8071 | 0.8060 | 0.8680 |

As a baseline for comparison, we use arithmetic mean ($\bar{\mu}_a$) and geometric mean ($\bar{\mu}_g$) ensembling of the two attribute classifiers resnet18 and resnet34. Then, using the same matrix K as above, we define the probability of category c (animal) as $p(c|\mu)=K^T\bar{\mu}$, (for, $\bar{\mu}=\bar{\mu}_a$ and $\bar{\mu}_g$ resp.). We see from Table 3 that W. barycenter outperforms arithmetic and geometric mean on this task and shows its potential in attribute based classification.

Concerning multi-label prediction, For investigating W. barycenters on a multi label prediction task, we use MS-COCO with 80 objects categories. MS-COCO is split into training (82K images), test (35K), and validation (5K) sets, following the Karpathy splits used in the community. From the training data, the system 100 can build a set of 8 models using 'resnet18' and 'resnet50' architectures. One can use the mean Average Precision (mAP) which gives the area under the curve of P=f(R) for precision P and recall R, averaged over each class. mAP performs a sweep of the threshold used for detecting a positive class and captures a broad view of a multi-label predictor performance. The inventors have found that the performances from 8 models are reported where Multi-label models performances compared to published results on MS-COCO test set show that W. barycenter outperforms arithmetic & geometric means. Arithmetic and geometric means offer direct mAP improvements over our 8 individual models. For unbalanced W. barycenter, the transport of probability mass is completely defined by its matrix K=K in Algorithm 2.

In image captioning, in this task the objective is to find a semantic consensus by ensembling 5 image captioner models. The base model is an LSTM-based architecture augmented with the attention mechanism over the image. In this evaluation we selected captioners trained with cross entropy objective as well as GAN-trained models. The training was done on COCO dataset using data splits from: training set of 113 k images with 5 captions each, 5 k validation set, and 5 k test set. The size of the vocabulary size is 10096 after pruning words with counts less than 5. The matrix K=K in Algorithm 1 was constructed using word similarities, defined based on (i) GloVe word embeddings, so that K=exp(C/ε), where cost matrix C is constructed based on euclidean distance between normalized embedding vectors; and (ii) synonym relationships, where we created K based on the word synonyms graph and user votes from a thesaurus. The model prediction μ, for f=1, . . . , 5 was selected as the softmax output of the captioner's LSTM at the current time step, and each model's input was weighted equally: μ=1/m. Once the barycenter p was computed, the result was fed into a beam search (beam size B=5), whose output, in turn, was then given to the captioner's LSTM and the process continued until a stop symbol (EOS) was generated. In order to exploit the controllable entropy of W. barycenter via the entropic regularization parameter ε, we also decode using randomized Beam search of, where instead of maintaining the top k values, we sample D candidates in each beam. The smoothness of the barycenter in semantic clusters and its controllable entropy promotes diversity in the resulting captions. We baseline the W. barycenter ensembling with arithmetic and geometric means.

Figure 3:
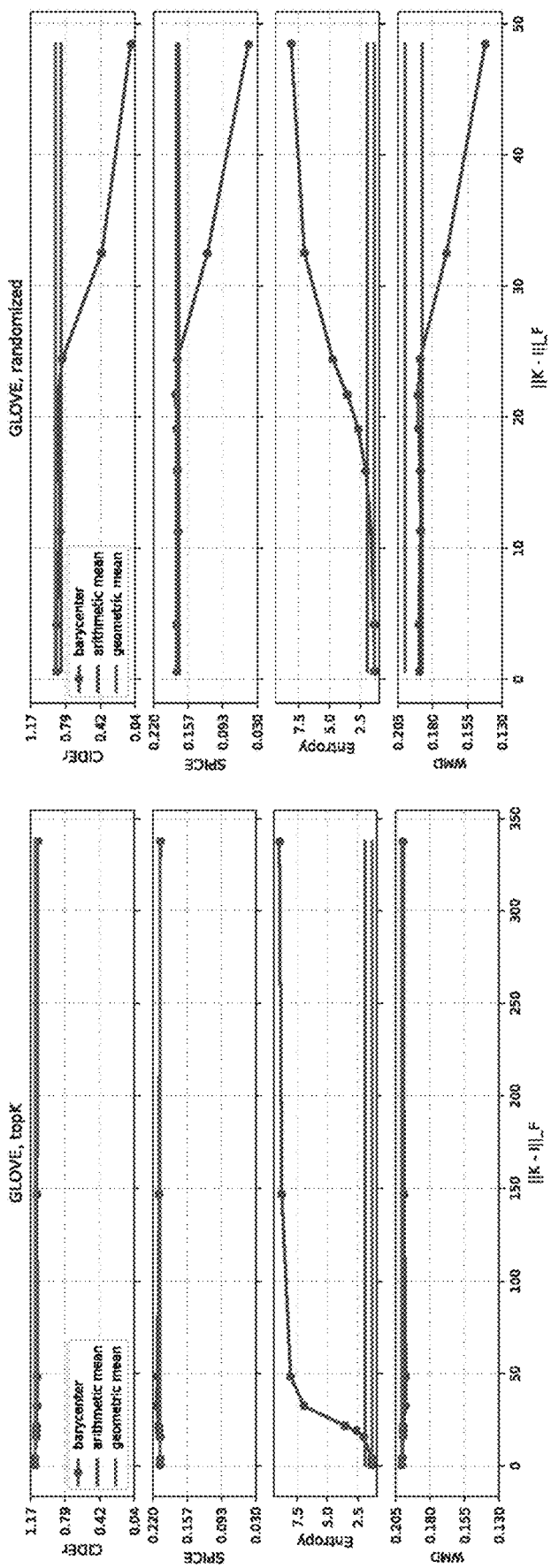
FIG. 3 illustrates a comparison of the ensembling methods.

FIG. 3 illustrates a comparison of the ensembling methods on COCO validation using GloVe-based similarity matrix K for 2 versions of beam search: topK (left panel) and randomized (right panel). The x-axis shows $\|K-I\|_F$, which corresponds to a different regularization parameter ε (varied form 1 to 50). We can see that for topK beam search (left panel) the further K is from the identity matrix, the larger the similarity neighborhood of each word, the more diverse are the generated captions (the barycenter has higher entropy), while still remaining semantically close to the ground truth. On the other hand, for randomized beam search (right panel), it is important to maintain a smaller similarity neighborhood, so that the generated sentences are not too different from the referenced ground truth.

FIGS. 2 and 3 show the comparison of the ensembling methods on the validation set using topK and randomized beam search. The x-axis shows $\|K-I\|_F$, which corresponds to a different regularization e (varied form 1 to 50). The figures report two n-gram based metrics: CIDEr and SPICE scores, as well as the WMD (Word Mover Distance) similarity, which computes the earth mover distance (the Wasserstein distance) between the generated and the ground truth captions using the GloVe word embedding vectors.

In topK beam search, as ε increases, causing the entropy to go up, the exact n-grams matching met-rics, i.e., CIDEr and SPICE, deteriorate while WMD remains stable. This indicates that while the barycenter-based generated sentences do not match exactly the ground truth, they still remain semantically close to it (by paraphrasing), as indicated by the stability of WMD similarity. The results of the GloVe-based barycenter on the test split of COCO dataset. In randomized beam search, the increase in entropy of the barycenter leads to a similar effect of paraphrasing but this works only up to a smaller value of ε, beyond which we observe a significant deterioration of the results. At that point all the words become neighbors and result in a very diffused barycenter, close to a uniform distribution. This diffusion effect is smaller for the synonyms-based K since there are only a certain number of synonyms for each word, thus the maximum neighborhood is limited.

It was found that Performance of GloVe-based W. barycenter on COCO test split using topK beam search versus Geometric and Arithmetic ensembling. While the generated sentences based on W. barycenter 20 do not match exactly the ground truth (lower CIDEr), they remain semantically close to it, while being more diverse (e.g., paraphrased) as indicated by the higher entropy and stable WMD.

The robustness of W. Barycenter to Semantic Perturbations is further detailed. Finally, the right panel of FIG. 3, shows the robustness of the W. barycenter 20 to random shuffling of the p values, within semantically coherent clusters. Note that the size of those clusters increases as K moves away from identity. The results show that barycenter 20 is able to recover from those perturbations, employing the side information from K, while both the arithmetic and geometric means (devoid of such information) are confused by this shuffling, displaying a significant drop in the evaluation metrics.

Figure 4:
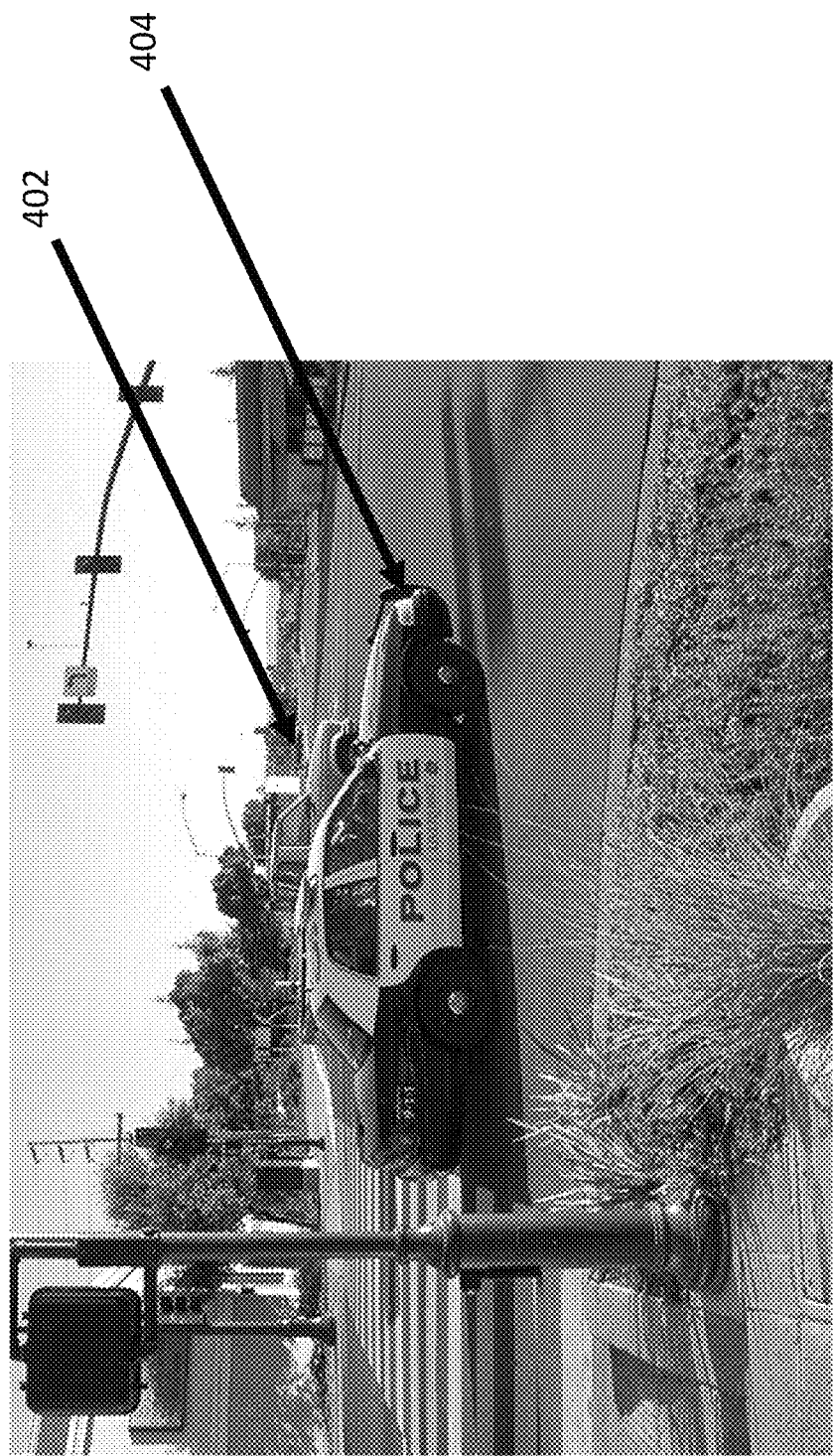
FIG. 4 illustrates is an example image processed by the system of the example embodiment.

FIG. 4 illustrates is an example image processed by the system of the example embodiment. The image includes a police car 404 and a pickup truck 402.

Figure 5:
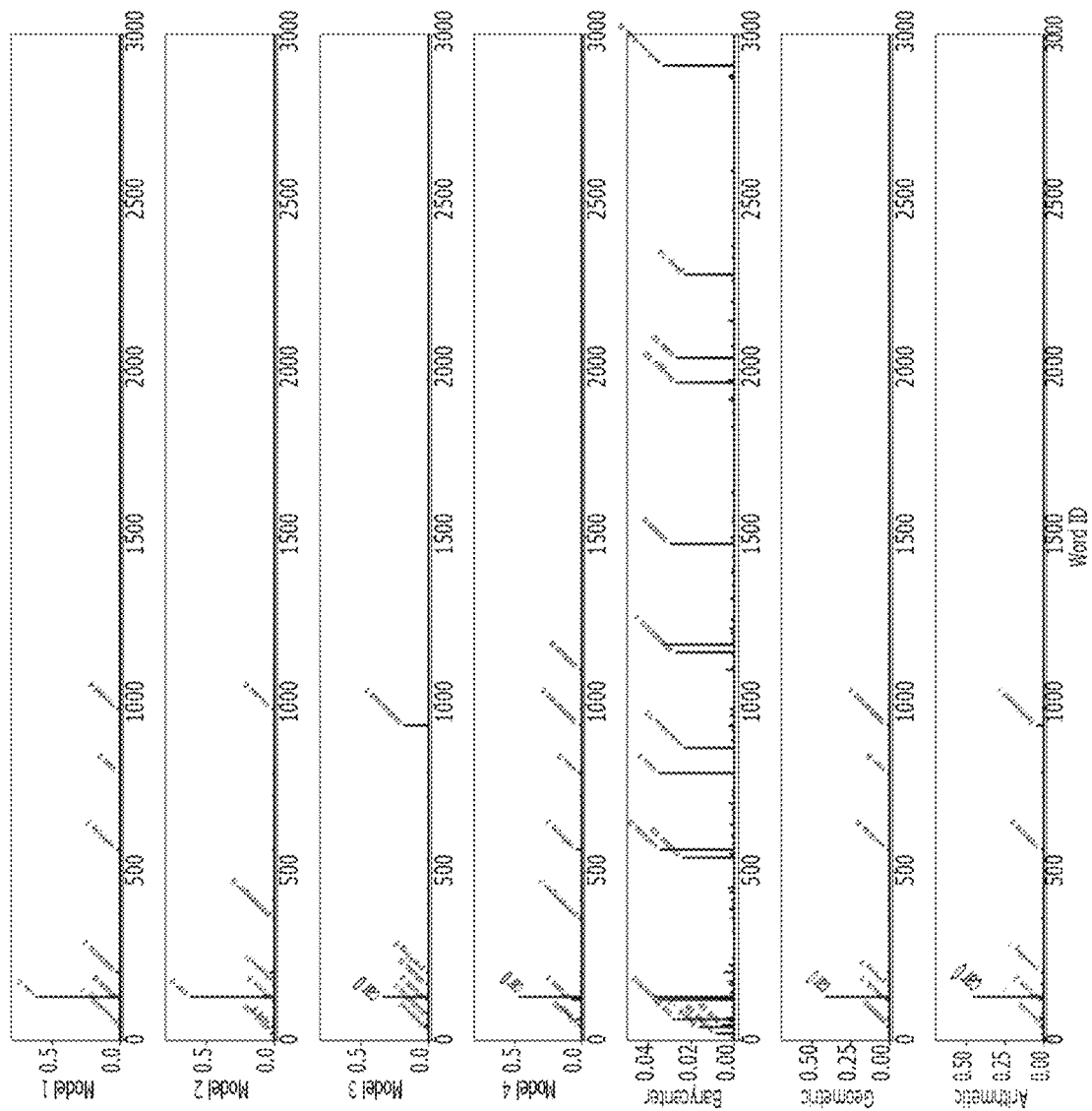
FIG. 5 illustrates a visualization of the word distributions of W. barycenter, arithmetic and geometric means.

FIG. 5 illustrates a visualization of the word distributions of W. barycenter, arithmetic and geometric means based on four captioning models, whose input image is shown on top (one of the ground-truth human-annotated captions for this image reads: "A police car next to a pickup truck at an intersection"). The captioner generates a sentence as a sequence of words, where at each step the output is a distribution over the whole vocabulary. The top four histograms show a distribution over the vocabulary from each of the model at time t=3 during the sentence generation process. The bottom three histograms show the resulting distribution over the vocabulary for the ensembles based on W. Barycenter 20 of the system 100, arithmetic and geometric means. It can be seen that the W. Barycenter 20 of the system 100 produces high entropy distribution, spreading the probability mass over the synonyms of the word "car" (which is the top word in all the four models), based on the synonyms similarity matrix K.

Figure 6:
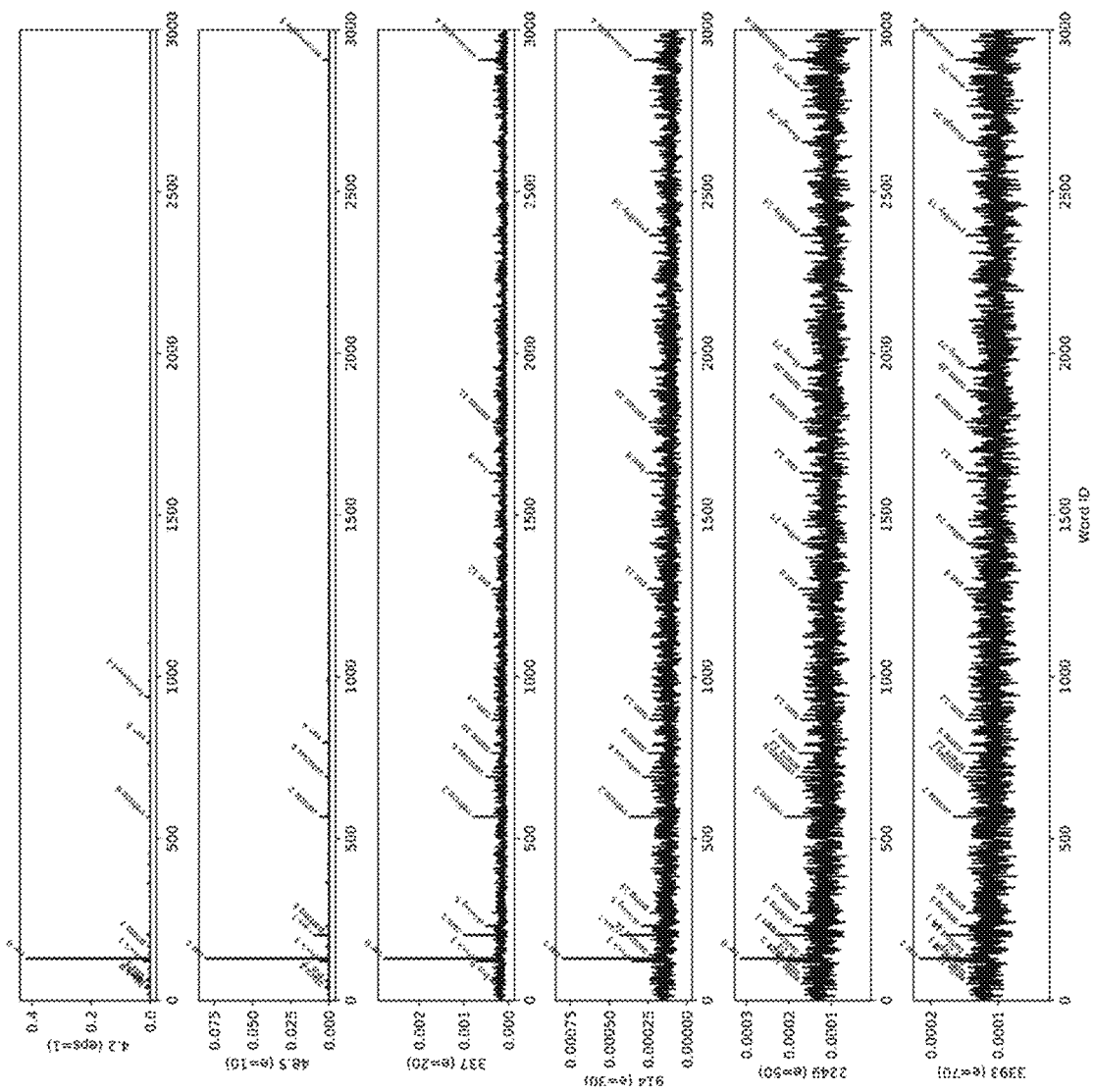
FIG. 6 is a visualization of the word distributions of W. barycenter for different similarity matrices.

FIG. 6 is a visualization of the word distributions of W. barycenter for different similarity matrices K based on GloVe (rows denote the distance of K from identity K $I_F$ and corresponding E). Large entropic regularization generates K close to uninformative matrices of all 1's. This eventually leads to a barycenter which is close to a uniform distribution spreading the probability mass almost equally across all the words.

Table 4 illustrates a mapping from a few top words in the barycenter output (for similarity matrix K based on synonyms) to the input models. For each word in the left columns, the remaining columns show the contributing words and the percent of contribution.

| Word | Model 1 | | Model 2 | | Model 3 | | Model 4 | |
|---|---|---|---|---|---|---|---|---|
| car | car | 90.00 | car | 95.28 | car | 84.96 | car | 53.93 |
| | vehicle | 5.16 | vehicle | 1.33 | truck | 9.08 | truck | 20.67 |
| | automobile | 1.62 | bus | 1.26 | vehicle | 2.74 | vehicle | 10.75 |
| | van | 0.92 | van | 0.93 | bus | 1.41 | bus | 10.01 |
| | bus | 0.85 | truck | 0.75 | van | 0.88 | van | 3.86 |
| jeep | car | 97.89 | car | 99.46 | car | 97.60 | car | 97.46 |
| | automobile | 1.30 | automobile | 0.38 | motorcycle | 1.72 | motorcycle | 1.28 |
| | jeep | 0.51 | jeep | 0.08 | jeep | 0.28 | jeep | 0.64 |
| | motorcycle | 0.27 | motorcycle | 0.07 | cab | 0.23 | cab | 0.46 |
| | limousine | 0.02 | cab | 0 | automobile | 0.16 | automobile | 0.16 |
| white | silver | 53.11 | white | 95.61 | white | 88.27 | white | 82.68 |
| | white | 46.49 | silver | 4.37 | snow | 6.63 | silver | 17.18 |
| | snowy | 0.30 | snowy | 0.02 | silver | 4.66 | snowy | 0.12 |

Table 4 illustrates a mapping from a few top words in the barycenter output (for similarity matrix K based on synonyms) to the input models. For each word in the left columns, the remaining columns show the contributing words and the percent of contribution.

| Word | Model 1 | | Model 2 | | Model 3 | | Model 4 | |
|---|---|---|---|---|---|---|---|---|
| pale | 0.06 | pale | 0 | pale | 0.24 | pale | | 0.01 |
| blank | 0.04 | blank | 0 | blank | 0.2 | ivory | | 0.01 |

FIGS. 7 through 10 are examples of captions for several images. BA: Wasserstein Barycenter, AM: Arithmetic mean, GM: Geometric mean, GT: Ground truth.

Figure 7:
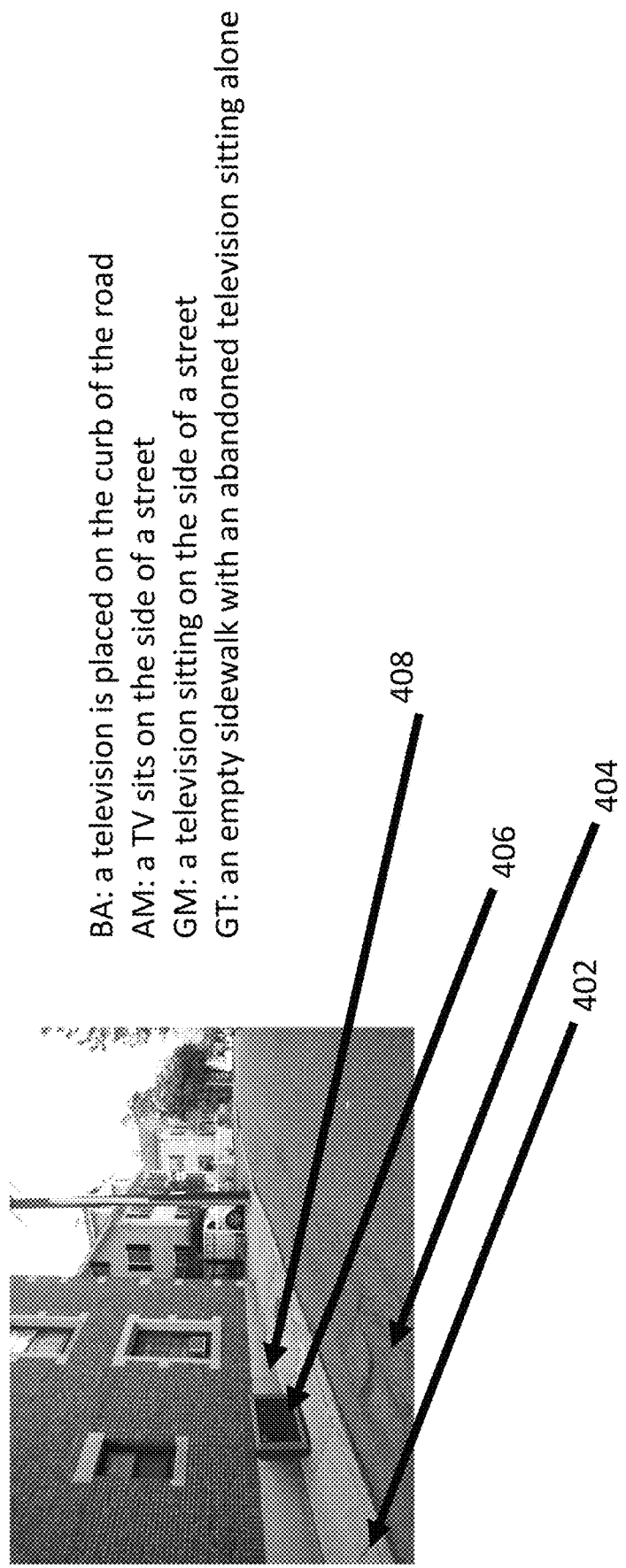
FIG. 7 illustrates is an example caption for an image.

FIG. 7 illustrates is an example caption for an image of a television 406. For BA Wasserstein barycenter: a television 406 is placed on the curb 408 of the road 404. Where for an Arithmetic Mean it is a TV 406 sits on the side of a street 404.

For a geometric mean, it is a television 406 sitting on the side of a street 404.

Whereas for the ground truth (GT), it an an empty sidewalk 402 with an abandoned television 406 sitting alone.

Figure 8:
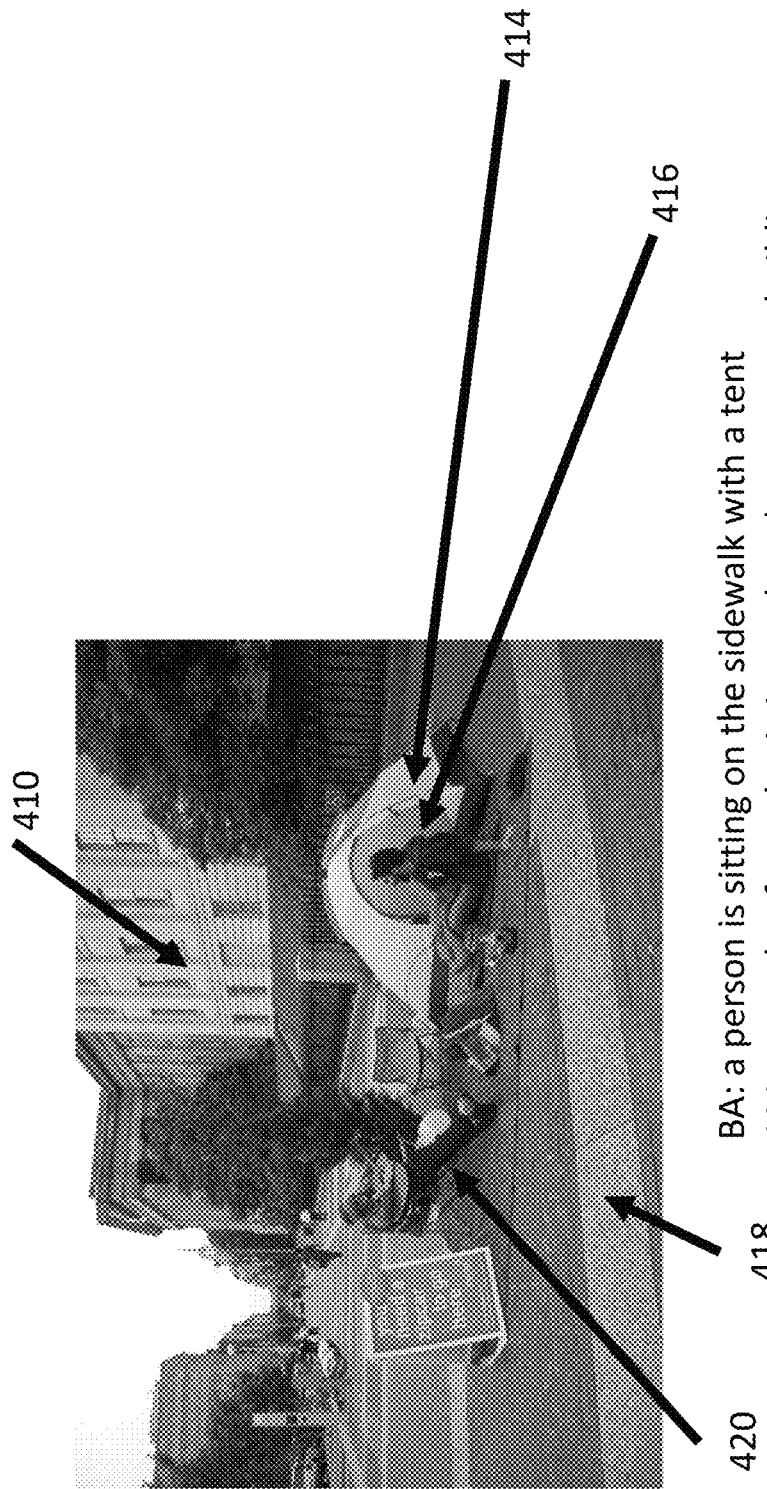
FIG. 8 illustrates is an example caption for another image.

FIG. 8 illustrates is an example caption for another image. The following is the results for each:
BA: a person 416 is sitting on the sidewalk 418 with a tent 414;
AM: a couple of people 416 and 420 sitting on benches next to a building 410;
GM: a couple of people 416 and 420 sitting on the side of a street; and
GT: a woman 420 is sitting with a guitar near a man 416 that is sitting on the ground in front of a tent 414

Figure 9:
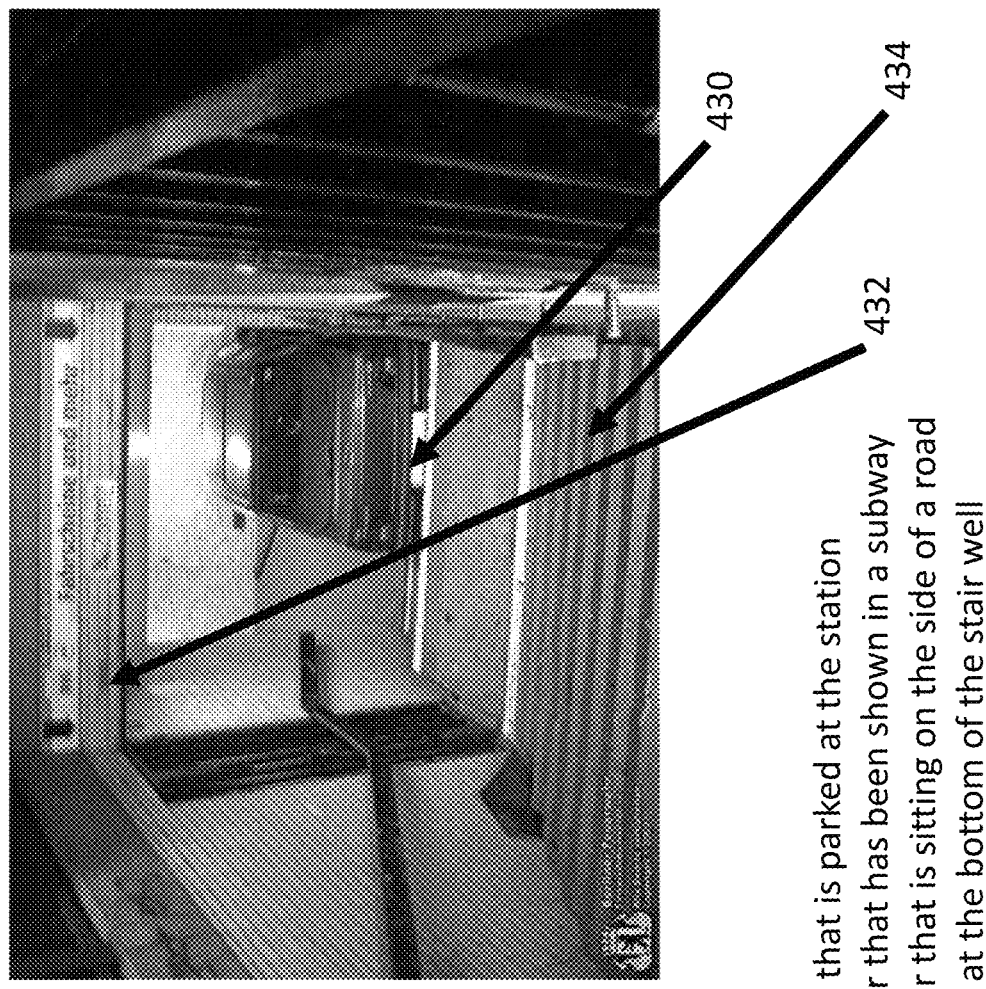
FIG. 9 illustrates is an example caption for yet another image.

FIG. 9 illustrates is an example caption for another image. The following is the results for each:
BA: a car 430 that is parked at the station 432;
AM: a car 430 that has been shown in a subway;
GM: a car 430 that is sitting on the side of a road; and
GT: a car 430 at the bottom of the stair well 434.

Figure 10:
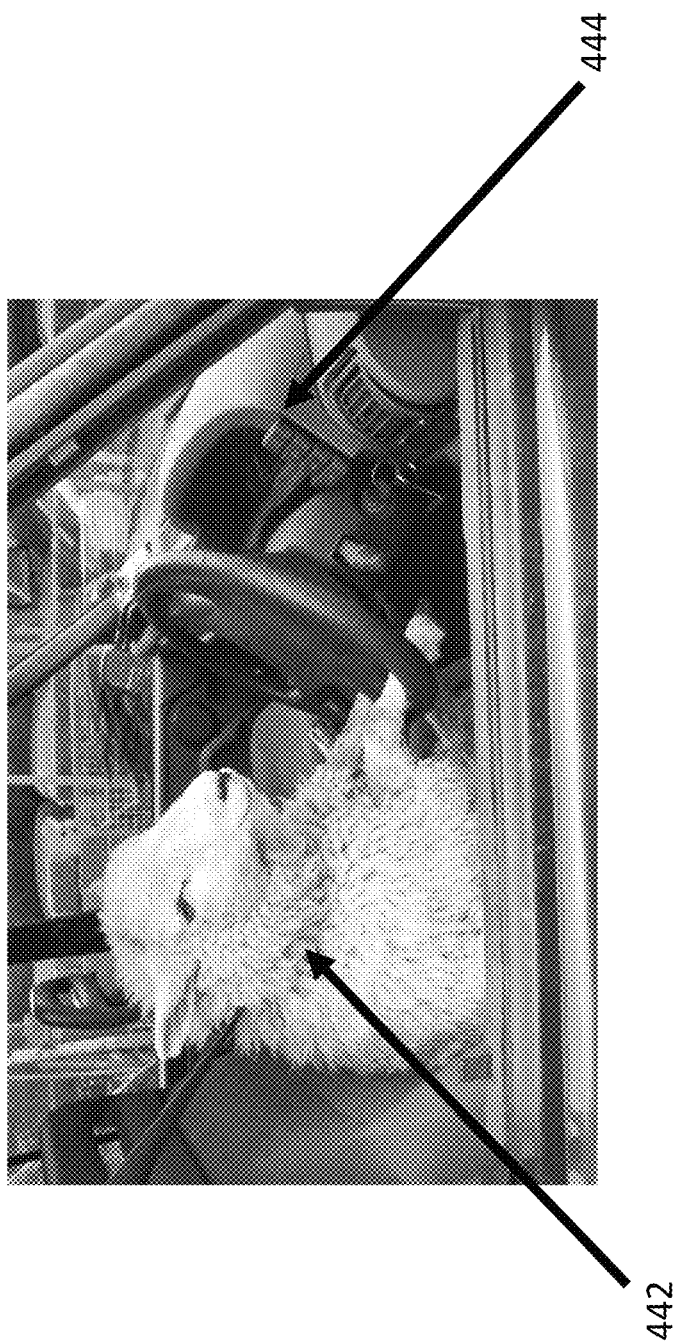
FIG. 10 illustrates is an example caption for yet another image.

FIG. 10 illustrates is an example caption for another image. The following is the results for each:
BA: a sheep 442 sitting in a car 444 looking out the window;
AM: a white sheep 442 is sitting in a vehicle;
GM: a close up of a sheep 442 in a car 444; and
GT: a sheep 442 sitting at the steering wheel of a car 444 with its hooves on the wheels.

As shown above, the W. barycenters 20 are effective in model ensembling in machine learning. In the unbalanced case the system 100 showed their effectiveness in attribute based classification, as well as in improving the accuracy of multi-label classification. In the balanced case, it was shown that they promote diversity and improve natural language generation by incorporating the knowledge of synonyms or word embeddings.

Figure 11:
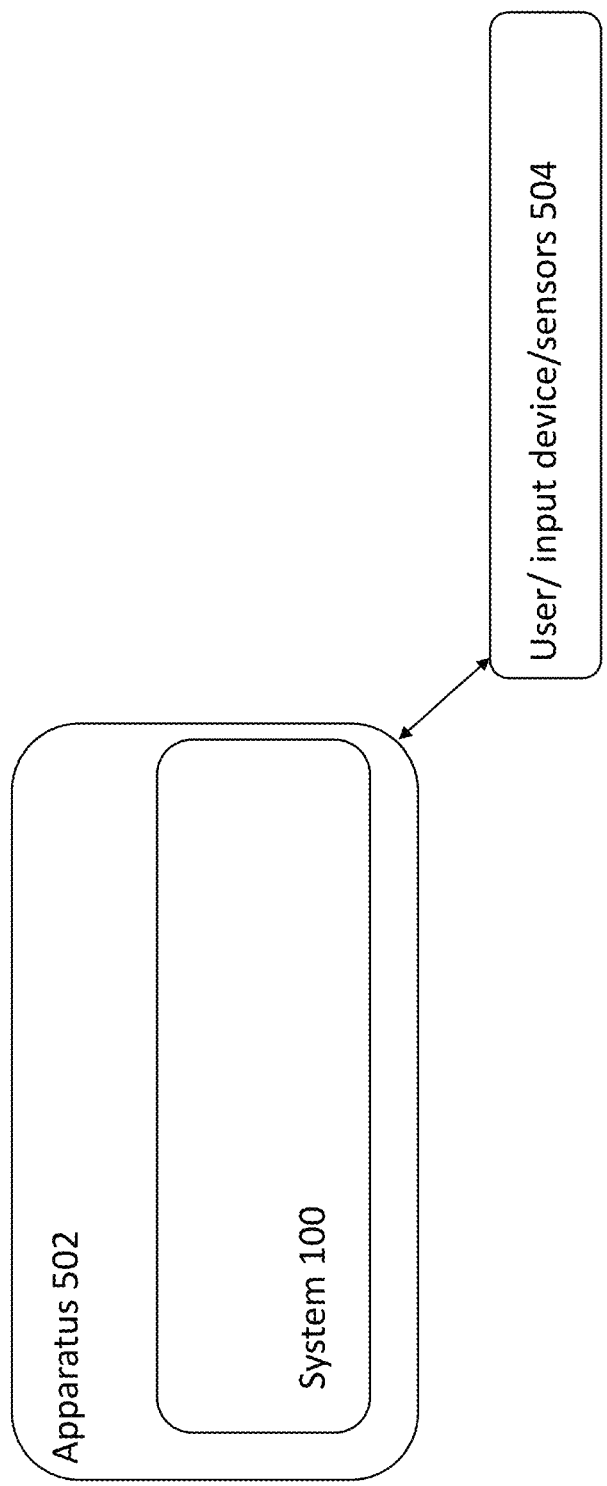
FIG. 11 illustrates an example configuration of the example embodiment.

FIG. 11 illustrates an example configuration of the example embodiment. The system 100 is included into an apparatus 502, which receives input from the outside from sensors, a user, or other input device 504.

Figure 12:
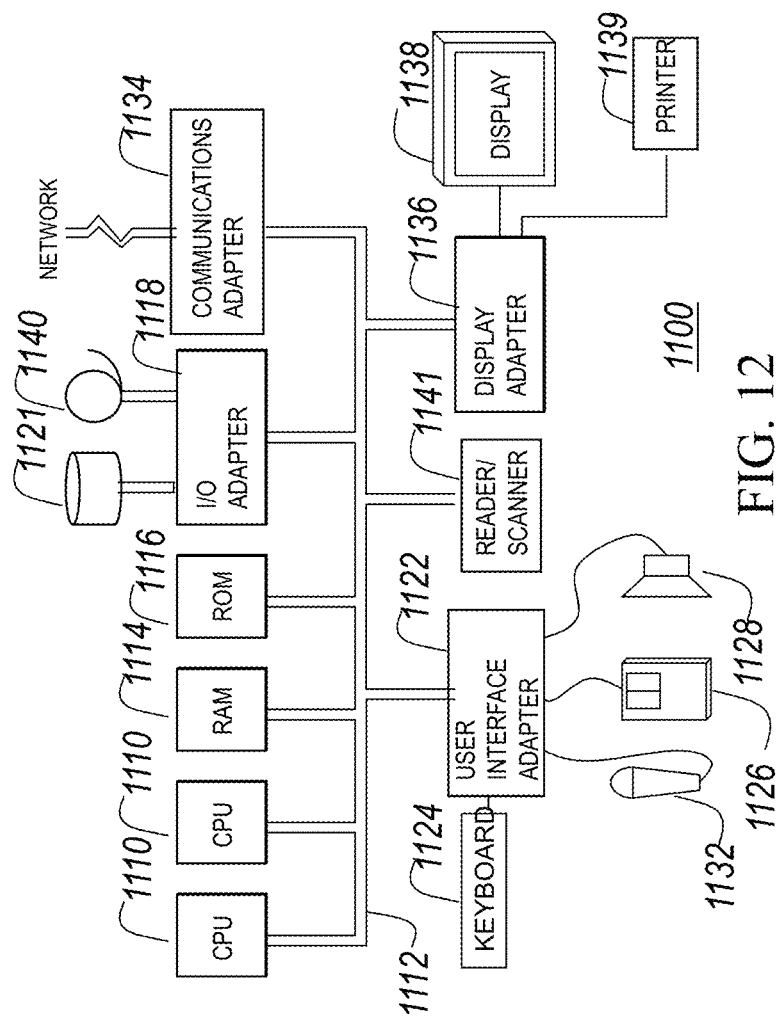
FIG. 12 illustrates an exemplary hardware/information handling system for incorporating the example embodiment of the invention therein.

FIG. 12 illustrates another hardware configuration of the system 100, where there is an information handling/computer system 1100 in accordance with the present invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 13:
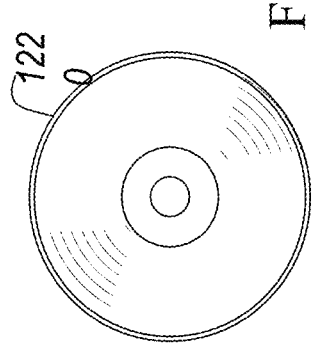
FIG. 13 illustrates a signal-bearing storage medium for storing machine-readable instructions of a program that implements the method according to the example embodiment of the invention.
Figure 13:
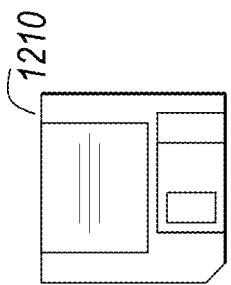

Alternatively, the instructions may be contained in another signal-bearing storage media 1200, such as a magnetic data storage diskette 1210 or optical storage diskette 1220 (FIG. 13), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
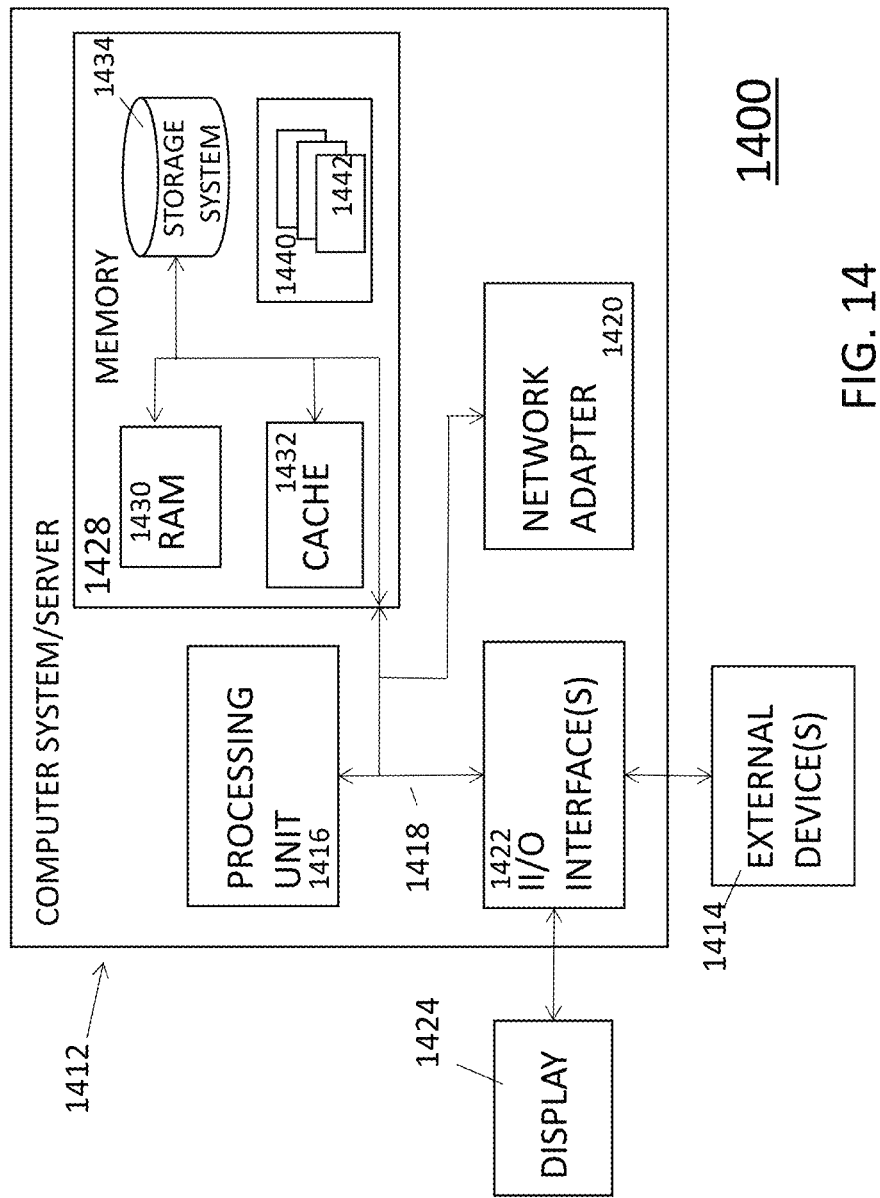
FIG. 14 depicts a cloud computing node according to an example embodiment of the present invention.

Referring now to FIG. 14, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 15:
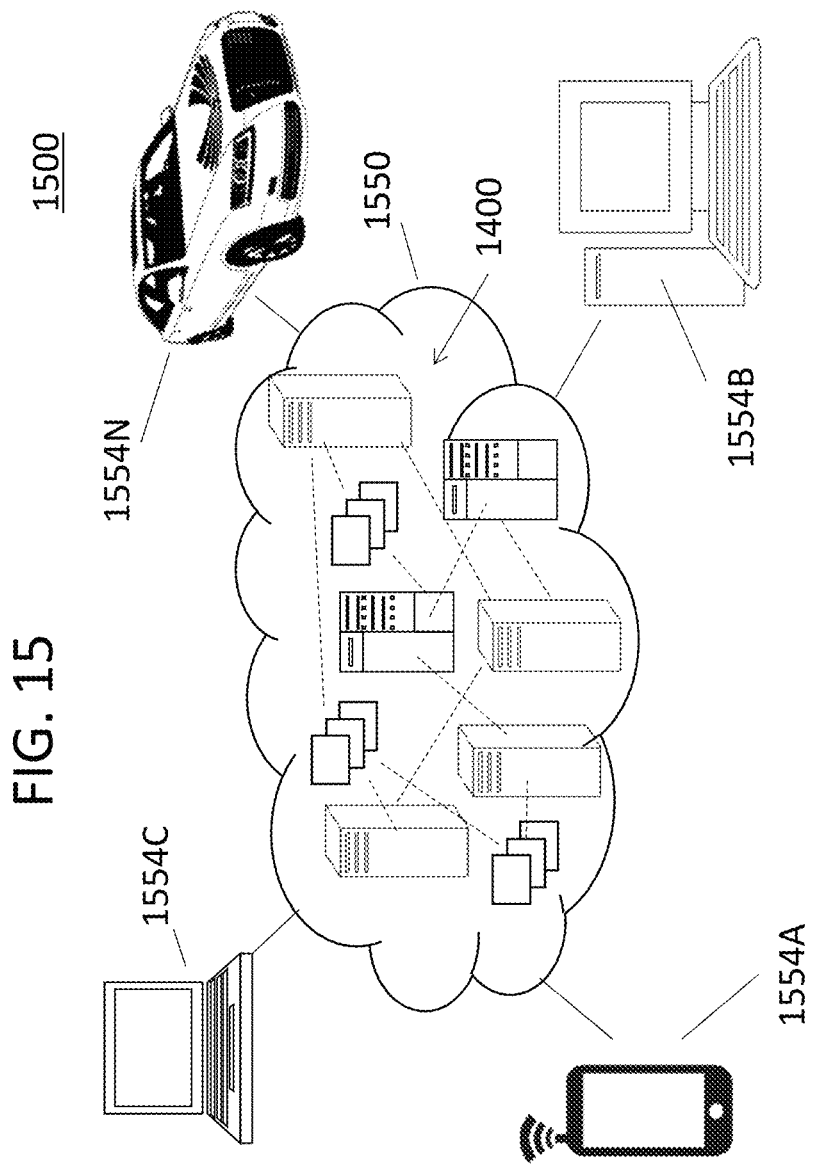
FIG. 15 depicts a cloud computing environment according to an example embodiment of the present invention.

Referring now to FIG. 15, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1400 and cloud computing environment 1550 can communicate with any type of computerized device over any type of network and/or network addressable connection (e.g., using a web browser).

Figure 16:
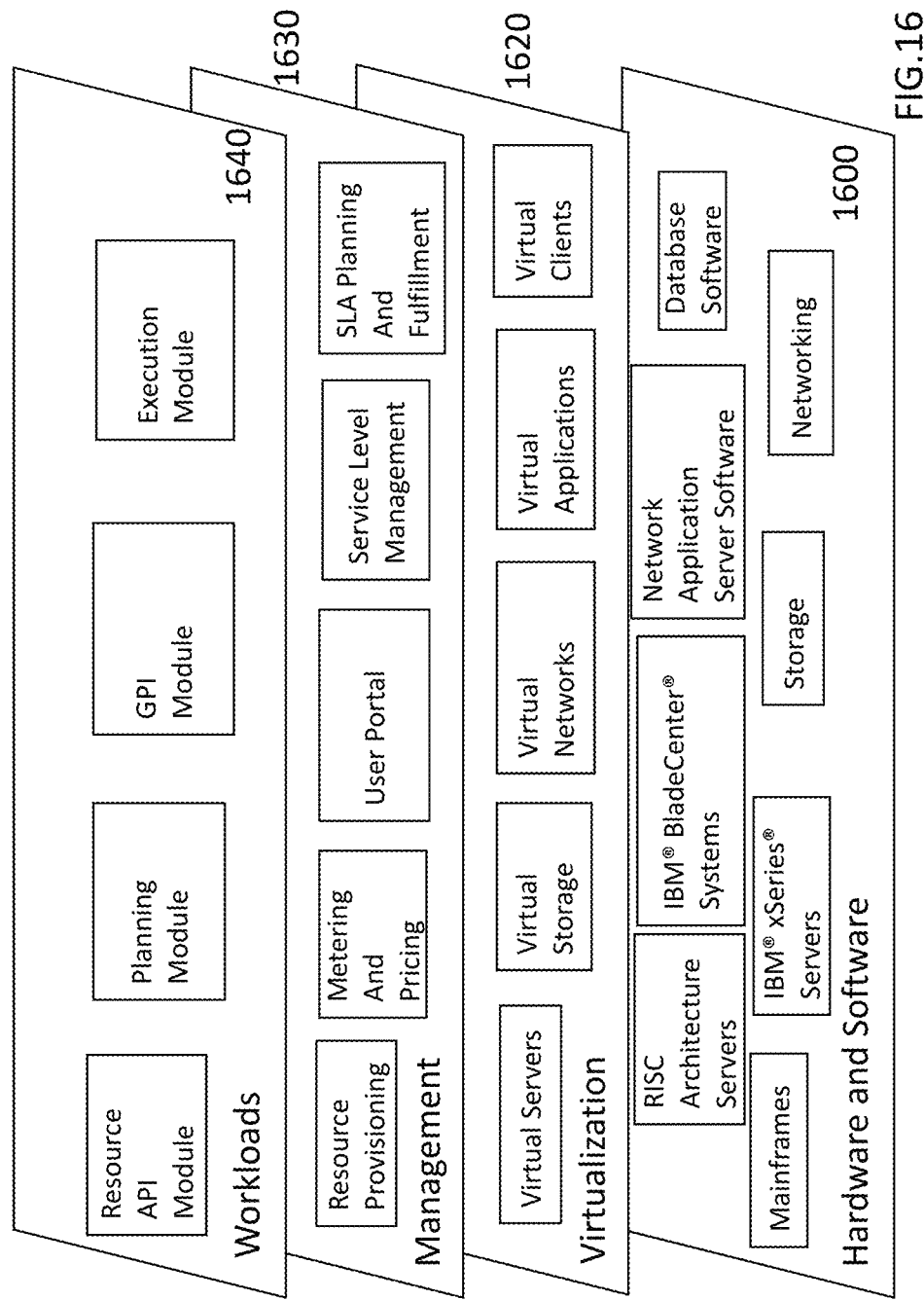
FIG. 16 depicts abstraction model layers according to an example embodiment of the present invention.

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method of ensembling, comprising:
   inputting a set of models that predict different sets of attributes;
   determining a source set of attributes and a target set of attributes using a Wasserstein barycenter with an optimal transport metric that includes a Wasserstein distance and is based on a cost matrix defining pairwise distances between semantic classes;
   inputting side information into the Wasserstein barycenter, wherein the side information includes class relationships represented by an embedding space;
   determining a consensus among the set of models whose predictions are defined on the source set of attributes; and
   training a neural network with the consensus.

2. The method according to claim 1, further comprising a plurality of the Wasserstein barycenters to determine the source set of attributes and the target set of attributes, each with the optimal transport metric for the set of models.

3. The method according to claim 1, wherein the side information further includes class relationships represented by a graph.

4. The method according to claim 1, wherein the Wasserstein barycenter takes into account the side information in the form of an optimal transportation cost, where the Wasserstein barycenter translates using the optimal transport costs from the source set of attributes to the set of target attributes.

5. The method according to claim 1 being cloud implemented for machine learning.

6. The method according to claim 1, wherein determining the consensus is based on a distribution that is relatable to each model of the set of models with a cost below a threshold, wherein the cost is defined by a distance in the embedding space.

7. The method according to claim 1, wherein determining the consensus among the set of models with the Wasserstein barycenter enables consideration of a semantic similarity of different outputs of respective models of the set of models.

8. A system for ensembling, comprising:
   a memory storing computer instructions; and
   a processor configured to execute the computer instructions to:
   input a set of models that predict different sets of attributes;
   determine a source set of attributes and a target set of attributes using a Wasserstein barycenter with an optimal transport metric that includes a Wasserstein distance,
   input side information into the Wasserstein barycenter, wherein the side information includes class relationships represented by an embedding space;
   determine a consensus among the set of models whose predictions are defined on the source set of attributes, wherein determining the consensus is based on a distribution that is relatable to each model of the set of models with a cost below a threshold; and
   train a neural network with the consensus.

9. The system according to claim 8, further comprising a plurality of the Wasserstein barycenters to determine the source set of attributes and the target set of attributes, each with the optimal transport metric for the set of models.

10. The system according to claim 9, wherein the Wasserstein barycenter takes into account the side information in the form of an optimal transportation cost, where the Wasserstein barycenter translates using the optimal transport costs from the source set of attributes to the set of target attributes.

11. The system according to claim 8, wherein the side information further includes class relationships represented by a graph.

12. The system according to claim 8 cloud implemented.

13. The system of claim 8, wherein the optimal transport metric that includes the Wasserstein distance is based on a cost matrix defining pairwise distances between semantic classes.

14. The system of claim 8, wherein determining the consensus among the set of models with the Wasserstein barycenter enables consideration of a semantic similarity of different outputs of respective models of the set of models.

15. The system of claim 8, wherein the cost is defined by a distance in the embedding space.

16. A computer program product comprising a computer readable storage medium having program instructions embodied therewith, the program instructions readable and executable by a computer to cause the computer to perform a method, comprising:
   inputting a set of models that predict different sets of attributes;
   determining a source set of attributes and a target set of attributes using a Wasserstein barycenter with an optimal transport metric that includes a Wasserstein distance;
      inputting side information into the Wasserstein barycenter, wherein the side information includes class relationships represented by an embedding space:
      determining a consensus among the set of models whose predictions are defined on the source set of attributes, wherein determining the consensus among the set of models with the Wasserstein barycenter enables consideration of a semantic similarity of different outputs of respective models of the set of models; and
   training a neural network with the consensus.

17. The computer program product according to claim 16, further comprising a plurality of the Wasserstein barycenters to determine the source set of attributes and the target set of attributes, each with the optimal transport metric for the set of models.

18. The computer program product according to claim 16, wherein the side information further includes class relationships represented by a graph.

19. The computer program product of claim 16, wherein the optimal transport metric that includes the Wasserstein distance is based on a cost matrix defining pairwise distances between semantic classes.

20. The computer program product of claim 16, wherein determining the consensus is based on a distribution that is relatable to each model of the set of models with a cost below a threshold, wherein the cost is defined by a distance in the embedding space.

* * * * *